US007233544B1

(12) United States Patent
McDonald

(10) Patent No.: US 7,233,544 B1
(45) Date of Patent: *Jun. 19, 2007

(54) HARBOR FENCE

(75) Inventor: Larry R McDonald, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/265,150

(22) Filed: Nov. 3, 2005

Related U.S. Application Data

(63) Continuation of application No. 10/863,986, filed on Jun. 9, 2004, now Pat. No. 6,980,483, which is a continuation-in-part of application No. 10/365,357, filed on Feb. 12, 2003, now Pat. No. 6,778,469.

(51) Int. Cl.
*G01S 15/04* (2006.01)
*B63G 9/00* (2006.01)

(52) U.S. Cl. .................... 367/93; 367/136; 114/240 R; 114/240 D

(58) Field of Classification Search .................. 367/93, 367/136; 114/240 R, 240 D
See application file for complete search history.

(56) References Cited

U.S. PATENT DOCUMENTS

| | | | |
|---|---|---|---|
| 2,395,056 A * | 2/1946 | Luby ...................... | 114/240 R |
| 3,914,729 A | 10/1975 | Sims et al. | |
| 3,922,631 A | 11/1975 | Thompson et al. | |
| 3,942,167 A * | 3/1976 | McClintock ................ | 340/620 |
| 4,081,784 A | 3/1978 | Wilson et al. | |
| 4,209,776 A | 6/1980 | Frederick | |
| 4,862,427 A | 8/1989 | Almagor et al. | |
| 4,961,393 A | 10/1990 | Murray | |
| 5,969,608 A | 10/1999 | Sojdehei et al. | |
| 6,591,774 B2 | 7/2003 | Metherell et al. | |
| 6,681,709 B1 * | 1/2004 | Nixon et al. ................. | 114/241 |
| 6,778,469 B1 | 8/2004 | McDonald | |
| 2003/0136325 A1 * | 7/2003 | Wooley et al. .......... | 114/240 R |
| 2003/0222778 A1 | 12/2003 | Piesinger | |

FOREIGN PATENT DOCUMENTS

| | | | |
|---|---|---|---|
| GB | 2111679 | | 7/1983 |
| GB | 2287564 | * | 9/1995 |
| GB | 2402369 | * | 12/2004 |
| WO | WO 90/01758 | | 2/1990 |

* cited by examiner

*Primary Examiner*—Ian J. Lobo
(74) *Attorney, Agent, or Firm*—Banner & Witcoff, Ltd.

(57) ABSTRACT

Methods and apparatus determine if an intruder passes into a security zone that is associated with a waterfront asset. An embodiment of the invention provides a harbor fence system that is designed to be deployed in water around ships or other waterfront assets to serve as a line-of-demarcation in order to provide protection. The harbor fence system comprises a series of spars that protrude above the water surface and that are connected with an electrical computer with a telemetry subsystem. Each spar contains electronic sensors, e.g. water immersion sensors and accelerometers, and circuitry to detect an intrusion and to communicate the location of the intrusion to a computer control station. The embodiment also facilitates deploying and retrieving the harbor fence system. Additionally, the embodiment may also determine whether an underwater intruder is passing under a protective boundary, in which the harbor fence system interfaces to an underwater sonar sensor subsystem.

42 Claims, 20 Drawing Sheets

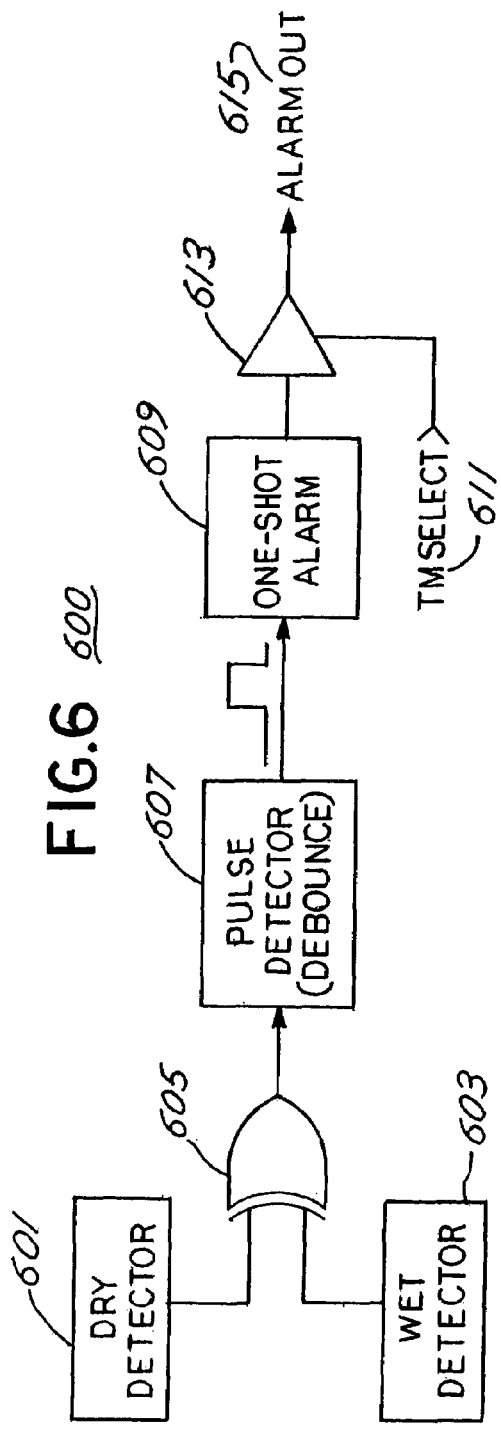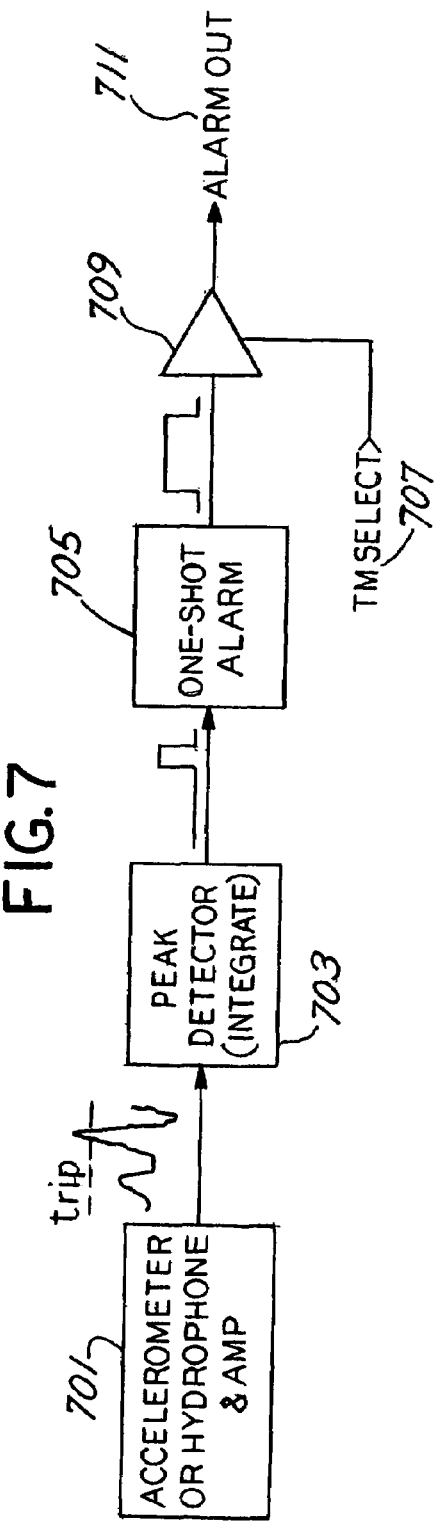

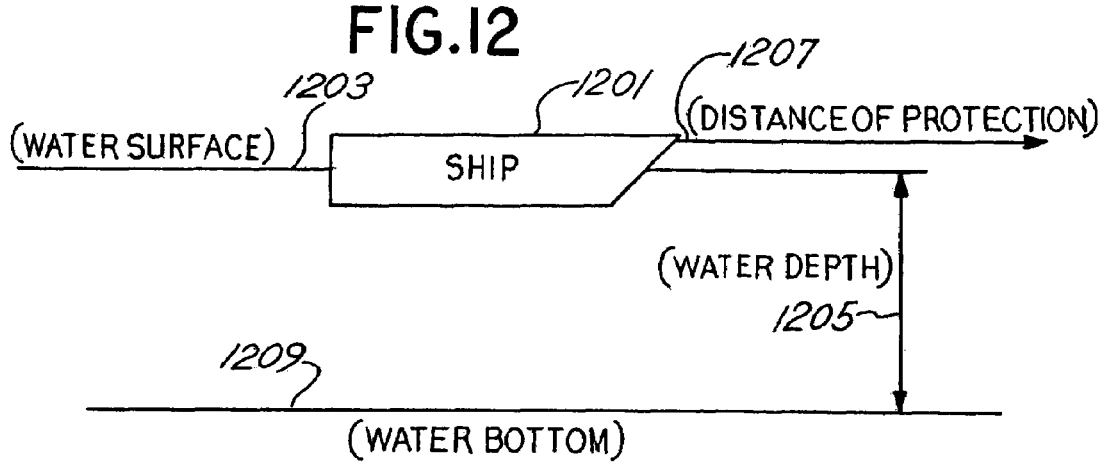
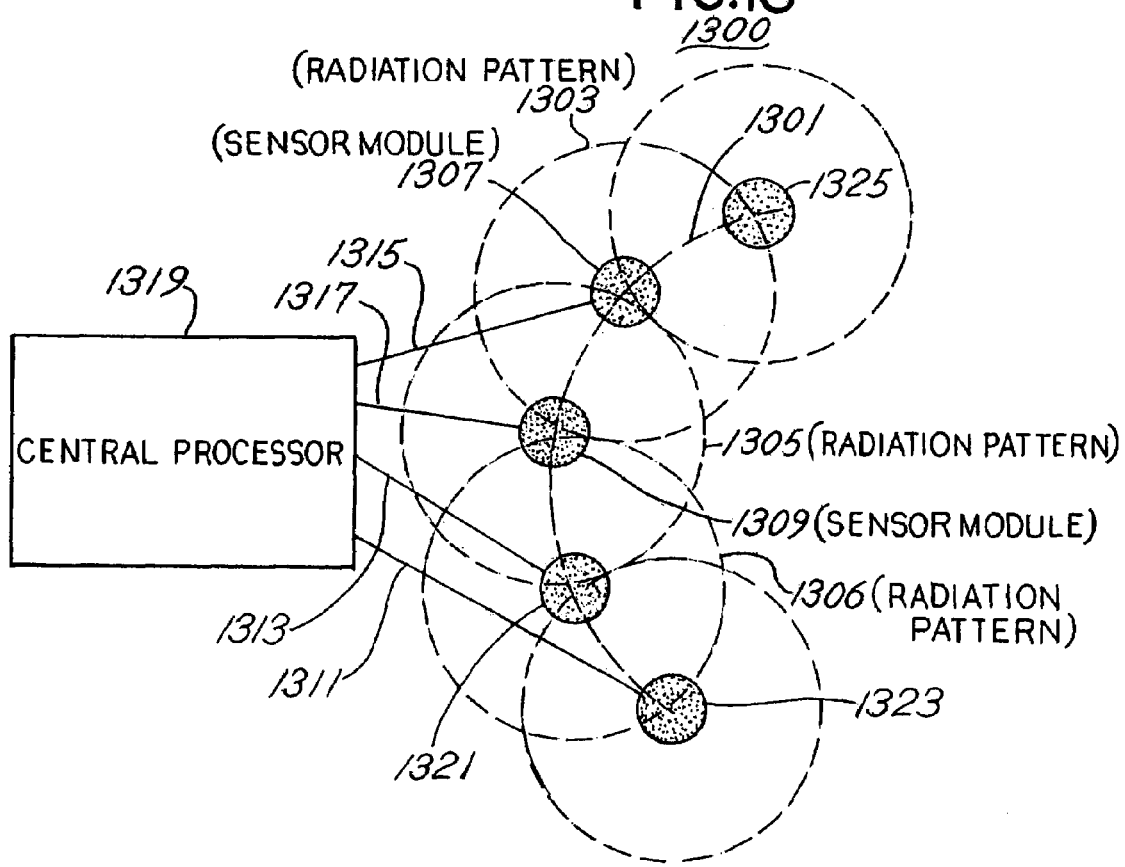

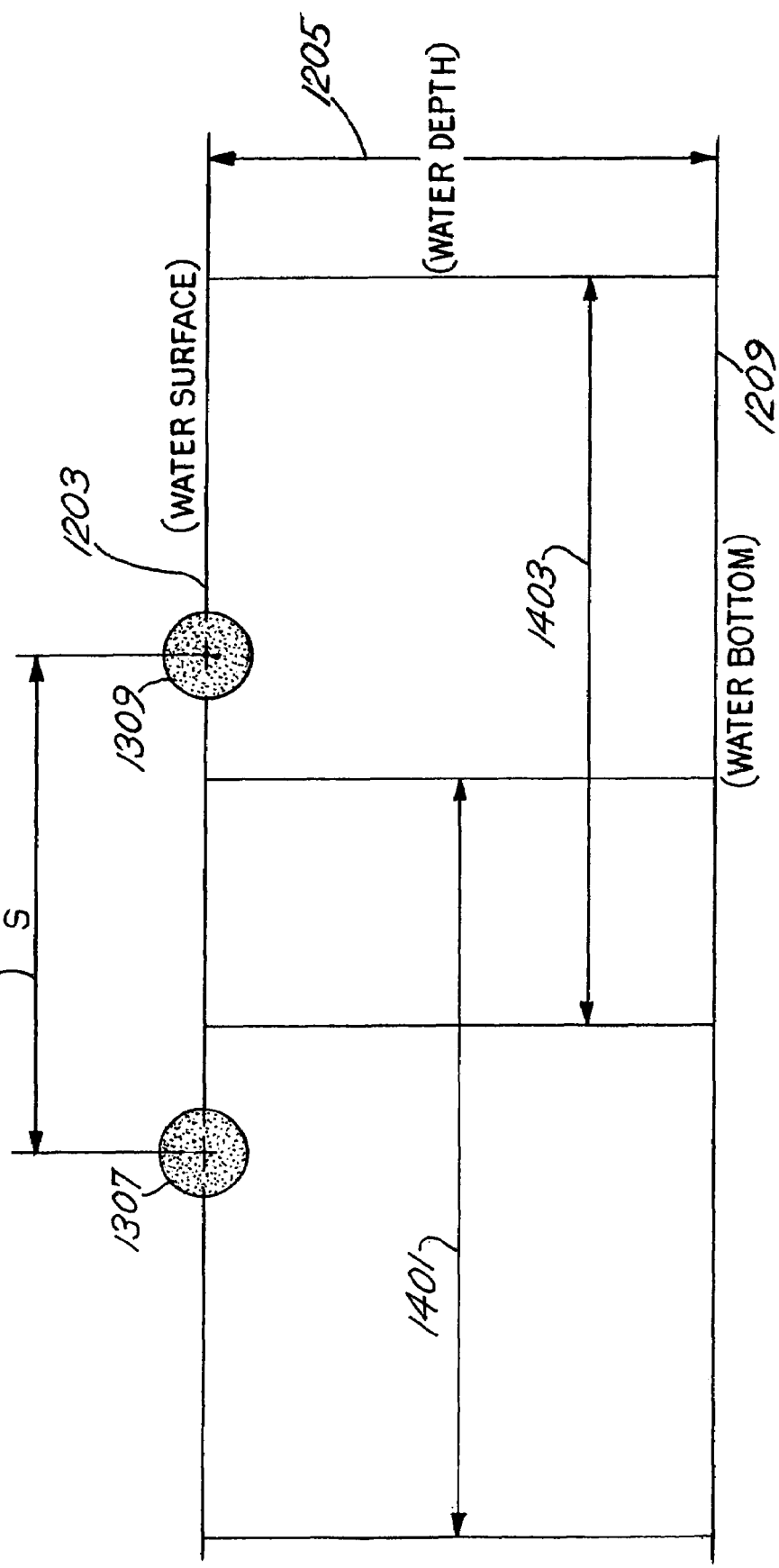

2300

2400

2500

2600

2700

HARBOR FENCE

This application is a continuation of and claims priority to commonly-owned U.S. application Ser. No. 10/863,986, filed Jun. 9, 2004 now U.S. Pat. No. 6,980,483 which is a continuation-in-part of common-owned, U.S. application Ser. No. 10/365,357 filed on Feb. 12, 2003 now U.S. Pat. No. 6,778,469 naming Larry R. McDonald as inventor, both of which are incorporated herein by reference in their entireties.

The U.S. Government has a paid-up license in this invention and the right in limited circumstances to require the patent owner to license others on reasonable terms as provided for by the terms of N41756-02-C-4682 awarded by the U.S. Navy.

FIELD OF THE INVENTION

The present invention relates to a surface barrier to protect an asset such as a ship that abuts a body of water.

BACKGROUND OF THE INVENTION

There are numerous situations in which a waterfront asset, such as military and civilian ships, that are situated in a harbor environment must be protected. Potential threats to the waterfront asset may originate at the surface of the water or below the surface of the water that abuts the asset. Typically, protective systems are passive barriers, such as oil booms or heavy fixed barriers to stop boats, or simple lines of small floats on the water. Security boom systems are typically heavy, usually difficult to deploy and moor, and are not intended to be portable. Moreover, security booms usually cannot be seen at night or in fog or rain, and do not provide any indications of intrusion.

Consequently, a method and apparatus that may provide continuous protection for an asset by automatically warning personnel about a possible intruder, that has a reduced cost, that has mobility so that the protective system may be transported with the ship as the ship changes locations, that can be configured for a desired perimeter typology, and that uses less power while providing a required degree of protection from surface and underwater predators would be beneficial to advancing the art of protective systems for waterfront assets.

BRIEF SUMMARY OF THE INVENTION

A harbor fence system may be deployed in water around ships or other waterfront assets to serve as a line-of-demarcation (visible day or night or in fog) to warn boats to stay out of the enclosed "security zone" or "exclusion zone" and to provide warnings and the location of any attempted intrusion across the harbor fence system. The harbor fence system may be lightweight and portable, capable of being transported on different sizes of ships (such as a navy ship), and deployed in different harbors where a ship may dock throughout the world in order to establish a security perimeter. The harbor fence may also be used to protect commercial ships, e.g. tankers and cruise lines) or other waterfront assets (e.g. buildings and bridges) abutting harbors, lakes, or rivers.

In one embodiment of the invention, a harbor fence system comprises a series of spars that protrude above the water surface, that are spaced approximately uniformly, and that are connected to an electrical computer with a telemetry subsystem. Each spar contains electronic sensors, e.g. water immersion sensors and accelerometers, and circuitry to detect intrusions and to communicate the location of the intrusion to a computer control station on shore or on the watch deck of the associated ship. The embodiment also facilitates deploying and retrieving the harbor fence system.

Additionally, the embodiment may also determine whether an underwater intruder is passing under a protective boundary, in which the harbor fence system interfaces to an underwater sonar sensor subsystem.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 6 shows a water crossing sensor circuit that is utilized in a harbor fence system according to an embodiment of the invention;

FIG. 7 shows an excessive impact sensor circuit that is utilized in a harbor fence system according to an embodiment of the invention;

FIG. 12 illustrates a ship that is protected by a sonar system;

FIG. 13 shows a sonar subsystem that protects a ship from underwater intruders in accordance with an embodiment of the invention;

FIG. 14 shows a vertical coverage of adjacent sonar sensor modules;

DETAILED DESCRIPTION OF THE INVENTION

Figure 1:
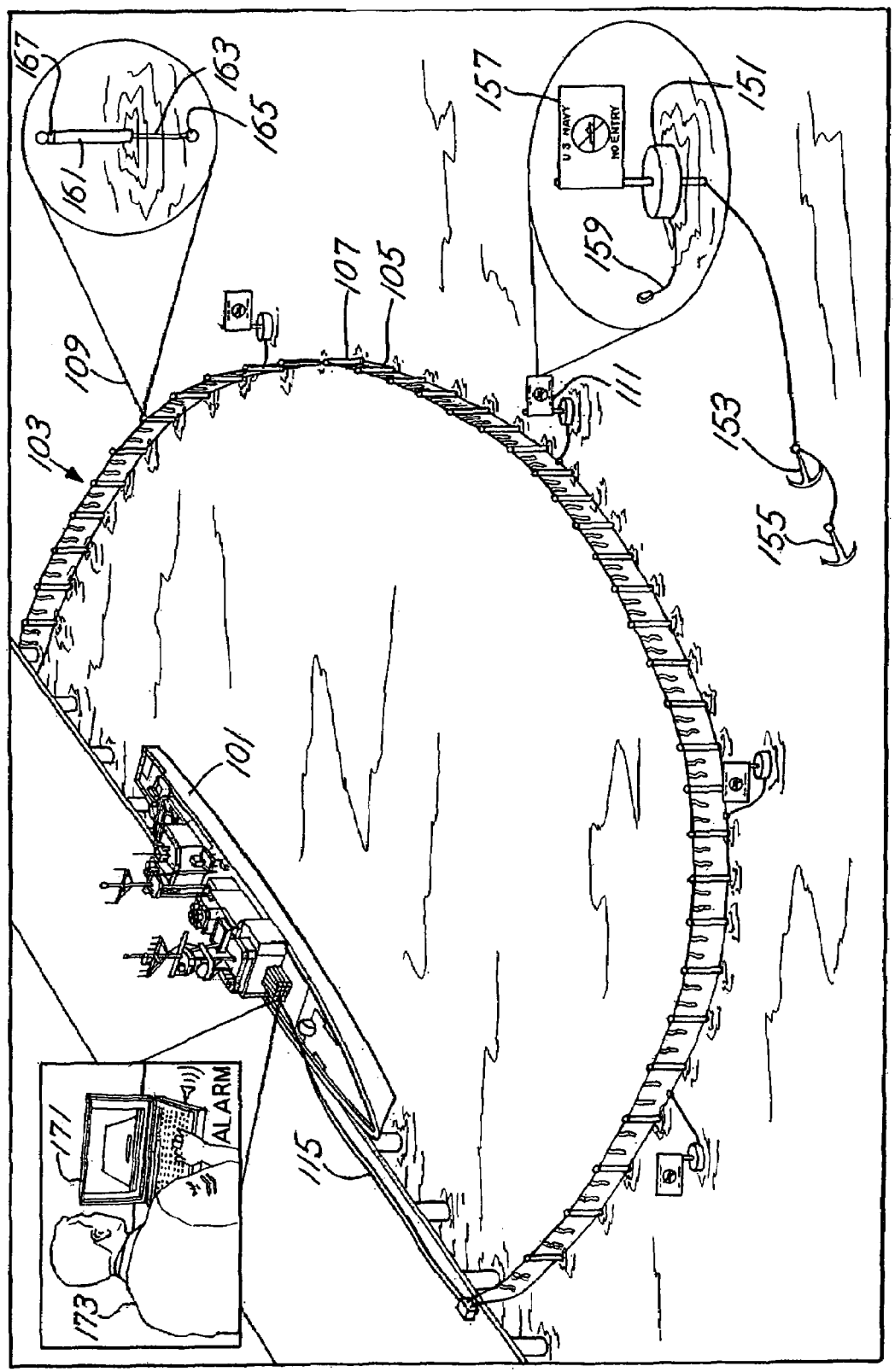
FIG. 1 illustrates a ship that is protected by a harbor fence system according to an embodiment of the invention.
Figure 2:
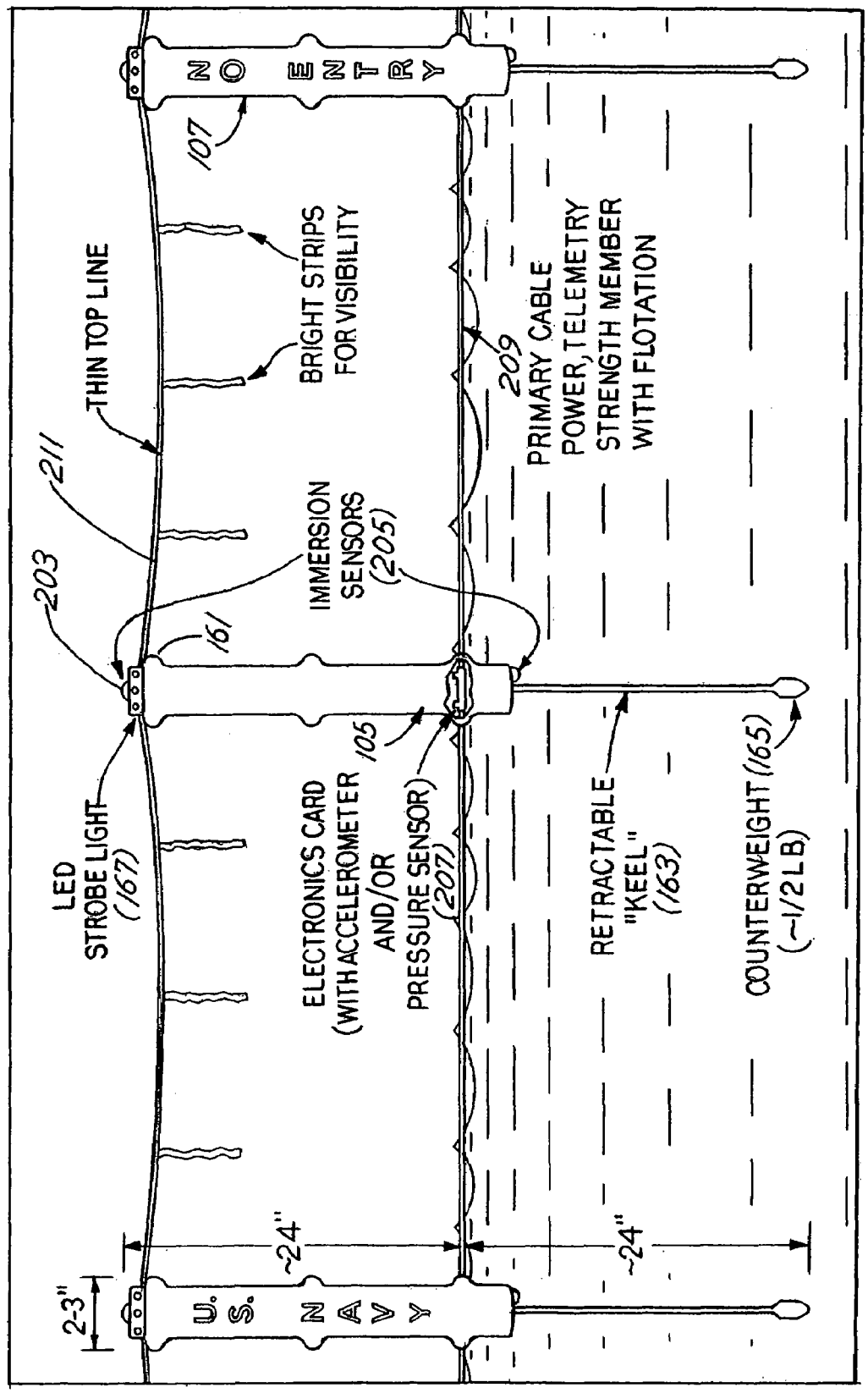
FIG. 2 shows a portion of the harbor fence system as shown in FIG. 1.
Figure 8:
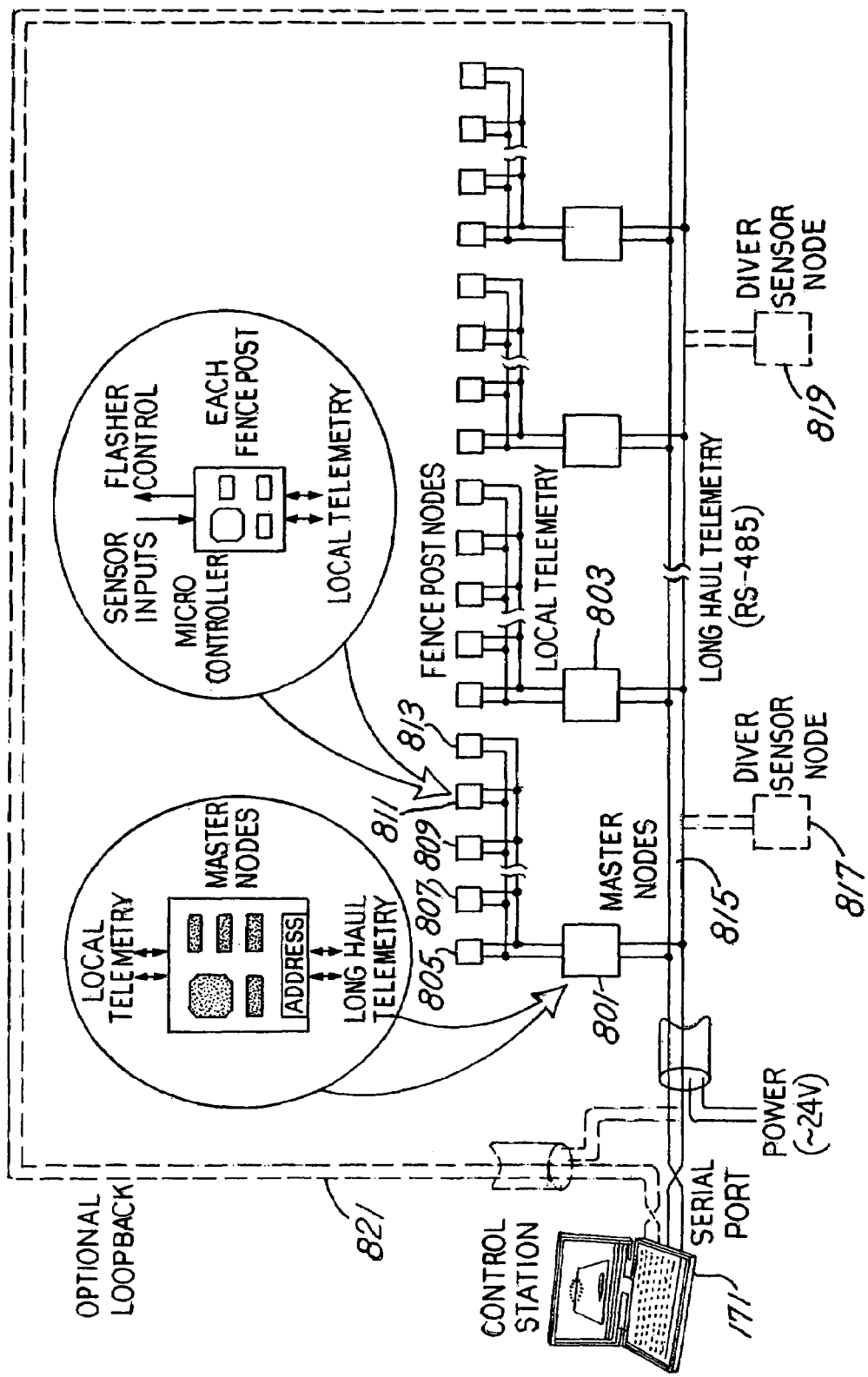
FIG. 8 shows a boom line telemetry subsystem according to an embodiment of the invention.

FIG. 1 illustrates a ship 101 that is protected by a harbor fence system 103 according to an embodiment of the invention. Ship 101 is moored along a pier that abuts a harbor. Variations of the embodiment may protect other types of waterfront assets (e.g. commercial ships, bridges, and buildings) that abut other types of bodies of water (e.g. rivers or lakes). Harbor fence 103 comprises a plurality of spars ("fenceposts"), e.g. spars 105, 107, and 109. The plurality of spars is connected together by a cable at the waterline containing multiple wires and by a thinner top line containing at least one wire (as shown in FIG. 2). A shape of harbor fence 103 is maintained by moors, e.g. moor 111. Moor 111 comprises a floating platform 151 that is anchored by anchors 153 and 155, that provides a base for flag 157, and that is connected to harbor fence 103 through connector 159. Spar 109 comprises an upper section 161, a LED strobe light 167, a retractable keel 163, and a counterweight 165. Spar 109 floats essentially at a water surface, in which upper section 161 has buoyancy while keel 163 and counterweight 165 provide stability to spar 109. LED strobe light 167 and flag 157 provide visible indications to anyone in the harbor (including potential intruders) about a presence of harbor fence system 103. LED strobe light may obtain electrical power and activation instructions from a control module (e.g. 801 and 803 as shown in FIG. 8) through a cabling arrangement. Upper section 161 may contain sensors that detect whether harbor fence system 103 is being impacted, lifted, or submerged by an intruder at a proximity of spar 109. Also, the embodiment can detect an occurrence when an intruder cuts any section of harbor fence system 103 by detecting a loss of communications with any of the spars over a telemetry subsystem (which is discussed in the context of FIG. 8) or by a detecting a cut in the top line. The plurality of spars communicates with a control unit 171 (that is located on shore or on ship 101) through cable 115. A user 173 enters commands into control unit 171 in order to configure harbor fence system 103 and to monitor an output device in order determine a status (e.g. a detection of an intruder) of harbor fence system 103.

FIG. 2 shows a portion of harbor fence system 103 as shown in FIG. 1. As was shown in FIG. 1, spar 105 comprises upper section 161, retractable keel 163, counterweight 165, LED strobe light 167, immersion sensors 203 and 205, and an accelerometer 207. (Variations of the embodiment may use other types of lighting such as floodlights or may use audio sounds such as a sirens.) Immersion sensor 203 is normally above the water surface (i.e. not normally exposed to water) and immersion sensor 205 is normally below the water surface (i.e. normally exposed to water). A lighting pattern for associated LED strobe lights may be controlled by an associated control module that, in turn, may be configured by control unit 171. Accelerometer 207 is sensitive to an impact by an intruder by sensing an acceleration imposed upon spar 105. Sensors 203, 205, and 207 provide inputs to electronic circuitry (as described in the context of FIGS. 6 and 7) that is contained in spar 109. The plurality of spars is connected together with a top line 211 and a primary cable 209. In addition to providing physical cohesion of the spars, primary cable 209 (which is included in the cable arrangement) also provides electrical power and communications, including communications between control unit 171 and control modules (e.g. 801 and 803 as shown in FIG. 8) and between control modules and associated spars. The top line contains at least one wire that when cut will result in an intrusion alarm signal. In order to provide additional visibility of harbor fence system 103, bright strips of visible material (e.g. plastic) may be attached to line 211 and large markings or letters may be painted on upper section 161.

Figure 3:
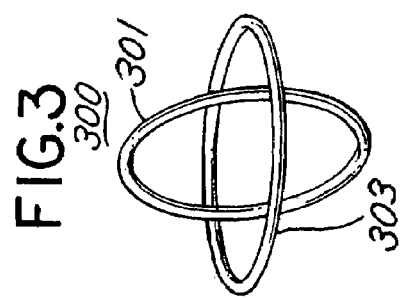
FIG. 3 shows a concentric hoop configuration that may be used as a flotation means for a harbor boom line according to an alternative embodiment of the invention.

FIG. 3 shows a concentric hoop configuration 300 that may be used as a flotation means for a harbor boom line according to an alternative embodiment of the invention. In some embodiments of the invention, other forms of flotation (other than spars as shown in FIGS. 1 and 2) may maintain harbor fence system 103 at the water surface. Concentric hoop configuration 300 comprises a plurality of flotation elements comprising hoop 301 and 303 that are approximately attached at a perpendicular angle with respect to each other. In this embodiment, the sensors and lights may be mounted within the hoops.

Figure 4:
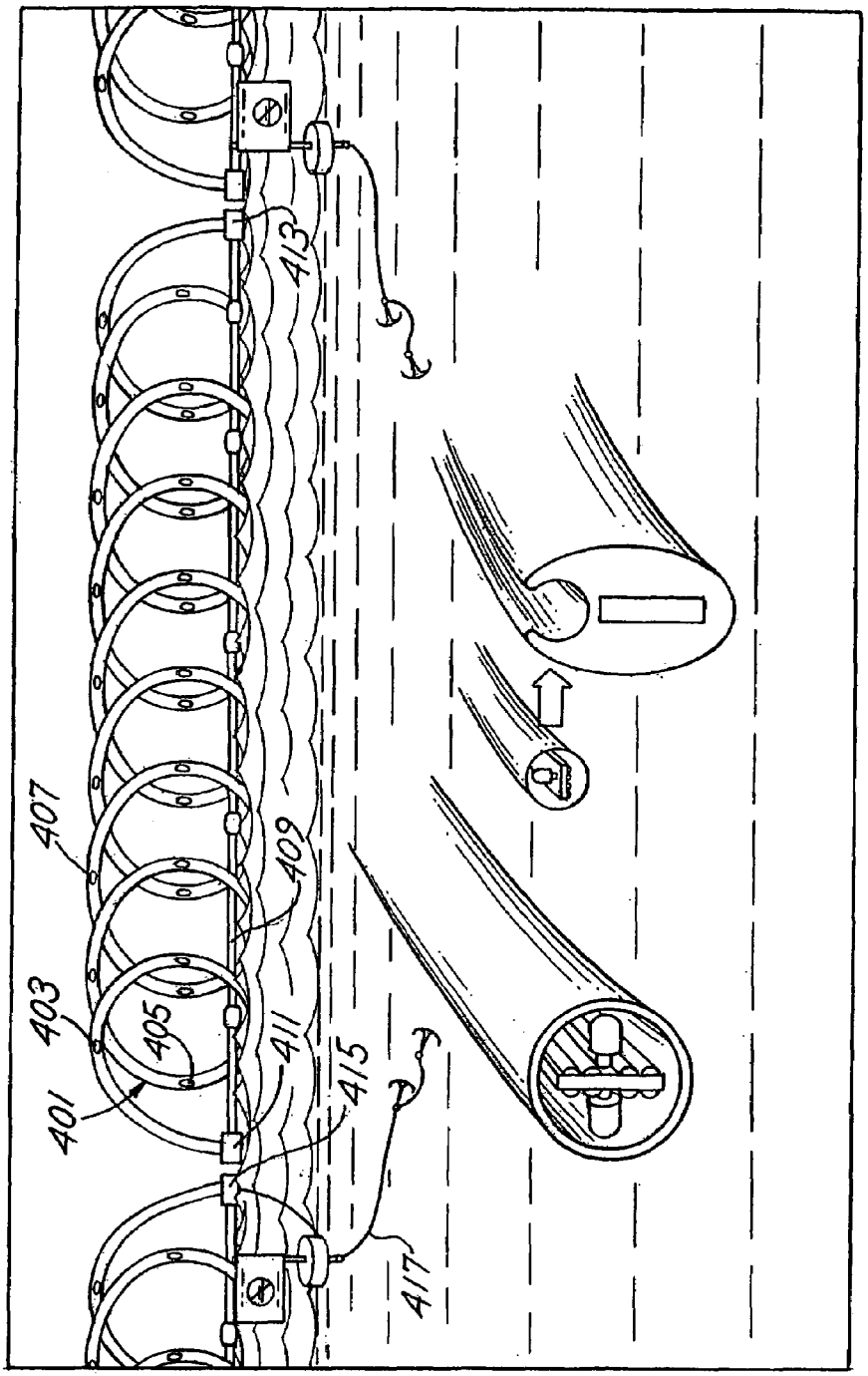
FIG. 4 shows a helix boom line configuration of a harbor fence system according to an alternative embodiment of the invention.

FIG. 4 shows a helix boom line configuration 401 of harbor fence system 103 according to another alternative embodiment of the invention. Helix boom line configuration 401 comprises a plurality of helix sections (one section being between connectors 411 and 413. Adjacent sections are attached together at mating connectors (e.g. connectors 415 and 411). A shape of helix boom line configuration 401 is maintained by moorings, e.g. mooring 417. Sensors (e.g. sensors 403, 405, and 407) and lights are distributed along helix boom line configuration 401. The helix material may be a transparent plastic to allow the lights to show through, or the lights may be mounted to protrude through holes in the helix wall. Communications and electrical power is provided by primary cable 409, and a "snubber" cable may be included down the center of the helix to limit its extension. Hooks on elastic bands may be provided to keep the helix in the closed position for retrieval and storage.

Figure 5:
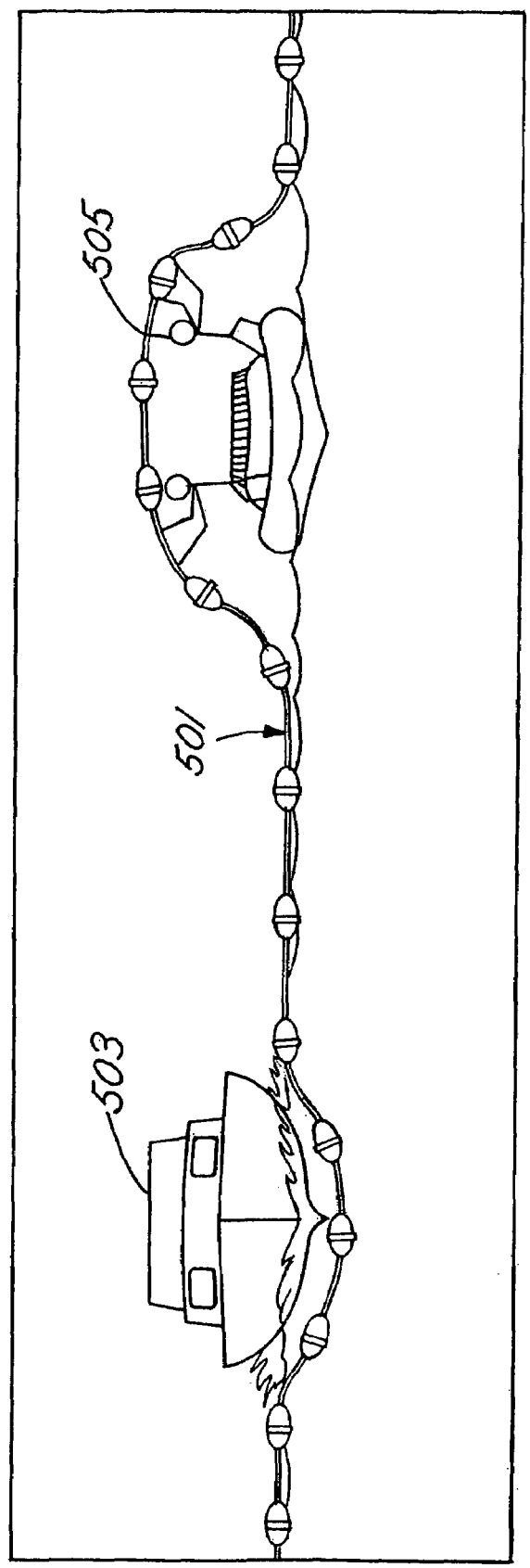
FIG. 5 shows a scenario in which a harbor fence system is being breached.

FIG. 5 shows a scenario in which harbor fence system 103 is being breached by intruders in surface craft. FIG. 5 illustrates that an intruder in a surface craft must lift, submerge, or cut harbor fence system 103 the harbor fence line in order to breach it. Harbor fence system 103 provides an alarm and intrusion location for any of these actions, as well as in the event of an excessive impact on one of the spar "fenceposts". In FIG. 5, an intruder 505 is lifting a section 501 of harbor fence system 103, while an intruder 503 submerges section 501 in order to pass through the perimeter of system 103. An intruder (not shown) may also pass under the surface of the water in an attempt to pass through the perimeter. (An embodiment of the invention addresses this latter possibility as discussed in the context of FIG. 13.) An embodiment of the invention may detect occurrences of such scenarios as will be discussed.

FIG. 6 shows a water crossing sensor circuit 600 that is utilized in harbor fence system 103 according to an embodiment of the invention. In the embodiment, water crossing sensor circuit 600 is incorporated at each spar (e.g. spar 105 as shown in FIG. 2). A wet detector 603 (corresponding to immersion sensor 205 in FIG. 2) is normally submerged in water and detects an occurrence when wet detector 603 is not exposed to water (as with intruder 505 lifting section 501 in FIG. 5). As an example, intruder 505 lifts the boom line, as shown in FIG. 5, and thus immersion sensor 205 is lifted from the water. Also, a dry detector 601 (corresponding to immersion sensor 203 in FIG. 2) is normally above the water surface and detects an occurrence when dry detector 601 is exposed to water (as with intruder 503 submerging section 501 in FIG. 5). As an example, intruder 503 runs over the boom line, as shown in FIG. 5, and thus immersion sensor 203 is submerged into the water. Outputs from dry detector 601 and wet detector 603 are combined by a logic gate 605. (The output of logic gate 605 is a logically "1" only if both inputs are logically "1" or if both inputs are logically "0".) An intrusion alarm is generated if the logic gate output is a logic "1", indicating that either both sensors are underwater (submerged) or both sensors are out of the water (lifted). In order to reduce the possibility of false detections (such as when a large wave temporally submerges the corresponding spar), a pulse detector determines if a positive sensor output should be construed as an occurrence of an intruder penetrating the perimeter of harbor fence system 103 by "debouncing" the output of OR gate 605. If pulse detector 607 determines the occurrence of an intruder, an alarm detector 609 is activated until water crossing sensor 600 is queried by a control module (not shown) selecting water crossing sensor circuit 600 by reading an alarm output 616 by selecting a driver 613 by activating a telemetry module (TM) select 611.

FIG. 7 shows an excessive impact sensor circuit 700 that is utilized in harbor fence system 103 according to an embodiment of the invention. An accelerometer 701 (corresponding to sensor 207 in FIG. 2) detects an occurrence of excessive impact on its "fencepost", such as when intruder 505 comes into contact with section 501 as shown in FIG. 5. (In variations of the embodiment, a hydrophone and amplifier may be used as an alternative sensor rather than an accelerometer.) An output of accelerometer 701 is integrated by a peak detector 703. (Peak detector 703 determines if the output from accelerometer 701 exceeds a threshold to determine if an intruder is detected. Harbor fence system 103 configures the threshold level or sensitivity of the detector, by a command being sent by control unit 171, in order to discriminate from erroneous detections such as when a spar is moved about by a wave or winds.) If an intruder is detected by the threshold of peak detector 703, an output from peak detector 703 sets a one-shot alarm 705 that is activated until excessive impact sensor circuit 700 is queried by a control module (not shown). The control module selects excessive impact sensor 700 by activating telemetry module (TM) select line 707 and reads the alarm output 711, after which the one-shot is cleared to be ready for the next impact measurement.

FIG. 8 shows a boom line telemetry subsystem 800 according to an embodiment of the invention. In the embodiment, a spar is associated with a fence post node (e.g. fence post nodes 805–813). Each fence post is associated with water crossing circuit 600 and excessive impact detector 700. Fence post nodes are multiplexed onto a local bus, in which a control module (e.g. control modules 801 and 803) can query each of the associated fence post nodes (e.g. 805–813). Moreover, each of the control modules may be queried by control unit 171 over a cabling configuration that comprises loop-around components 815 and 821. The cabling arrangement distributes electrical power to the control modules and to fence post nodes, and provides communication between control unit 171 and the control modules, from both ends or from either end of harbor fence system 103. In the embodiment, telemetry subsystem 800 uses two loop-around components in order to provide redundancy in a case in which one of the loop-around components becomes inoperative (e.g. when an intruder cuts one of the loop-around components). Electrical isolation of the cut wires will allow power and communications to all operative nodes on either side of the cut, even when the primary cable is cut, allowing multiple intrusions to be sensed.

The embodiment of harbor fence system 103 that is shown in FIG. 8 may be interfaced with an underwater sonar subsystem 1300 that can detect underwater intruders that may dive beneath the perimeter of harbor fence system 103. The cable arrangement interfaces to nodes 817 and 819 that may correspond to sonar sensor modules (e.g. sensor modules 1307, 1309, 1321, 1323, and 1325 as shown in FIG. 13) as will be discussed in the context of FIGS. 12–28. Referring to FIG. 8, control unit 171 may query any of the diver sensor nodes (e.g. 817 and 819) in order to obtain a status relating to a detection of an underwater intruder.

Figure 9:
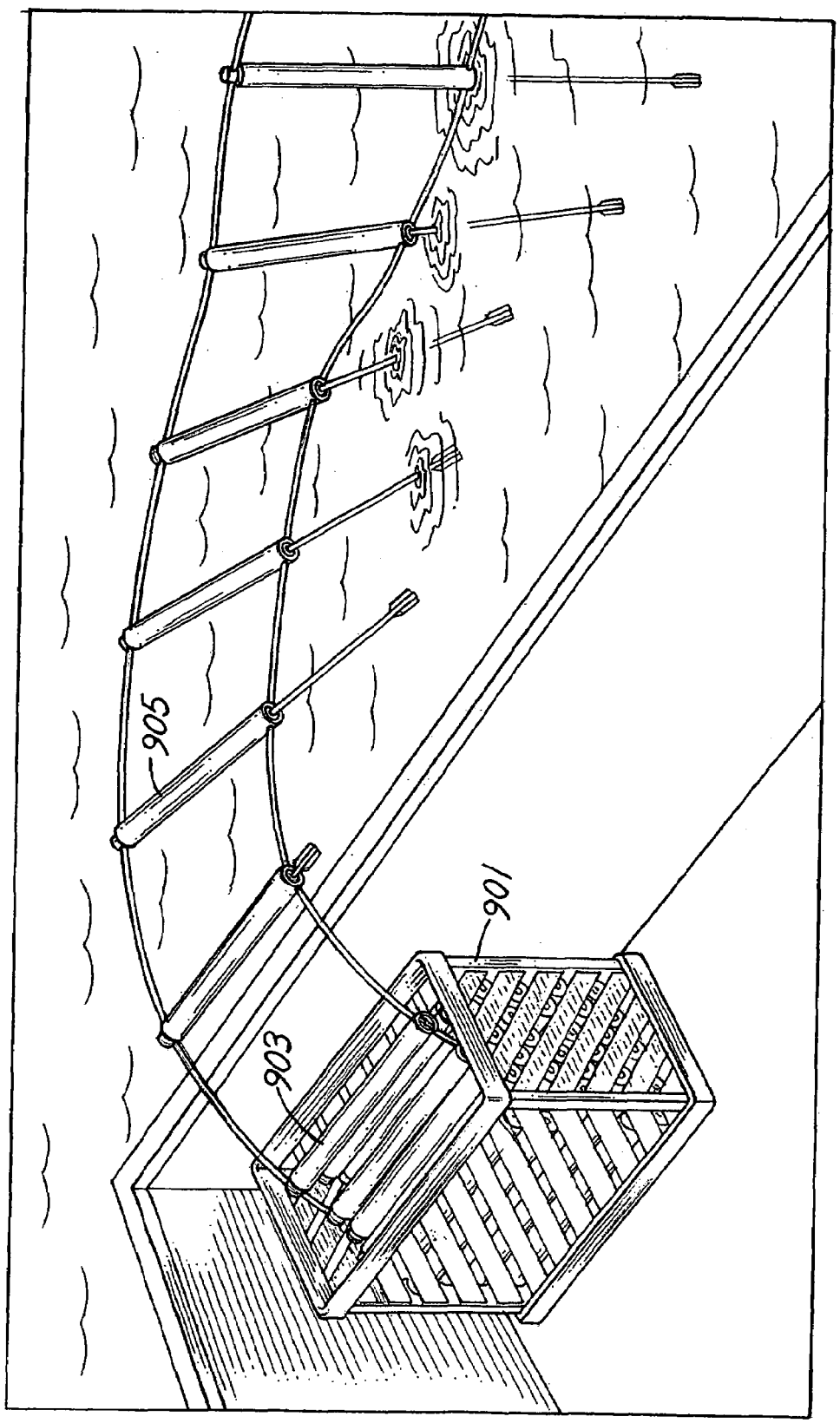
FIG. 9 shows deployment or retrieval of a harbor fence system according to an embodiment of the invention.

FIG. 9 shows deployment of harbor fence system 103 according to an embodiment of the invention. A plurality of spars (e.g. spar 903) and associated cabling of a deployed section of harbor fence system 103 is stored into container 901. The keel of spar 903 is retracted into the upper section of spar 903 when spar 903 is stored in container 901 in order to facilitate the storing of the deployed section. As the deployed section is removed from container 901, a keel (the shaft with the counterweight at the bottom) drops or is pulled from an upper section of an extracted spar (e.g. spar 905). When the end of the deployed section is reached, harbor fence system 103 may be expanded by another section by connecting the deployed section to the other section by connecting associated connectors. Retrieval of each section or module of harbor fence system 103 is accomplished in the reverse manner.

Figure 10:
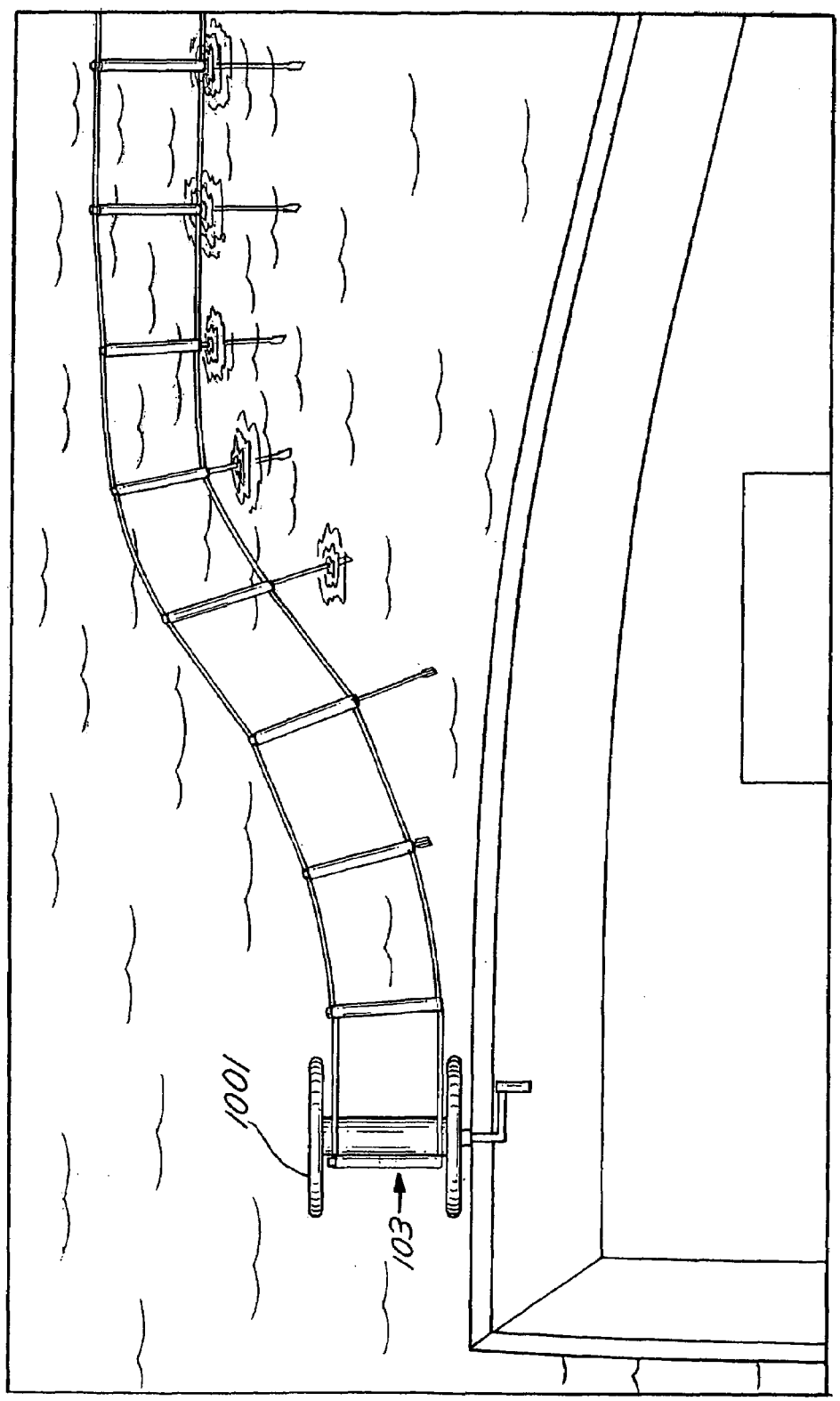
FIG. 10 shows a variation of deployment or retrieval of a harbor fence system according to an embodiment of the invention.

FIG. 10 shows a variation of deployment of harbor fence system 103 according to an embodiment of the invention. With the variation of the embodiment, a specially designed reel 1001 is used rather than container 901 when deploying a section of harbor fence system 103. Retrieval may be accomplished by winding the fenceposts and the cables back onto reel 1001.

Figure 11:
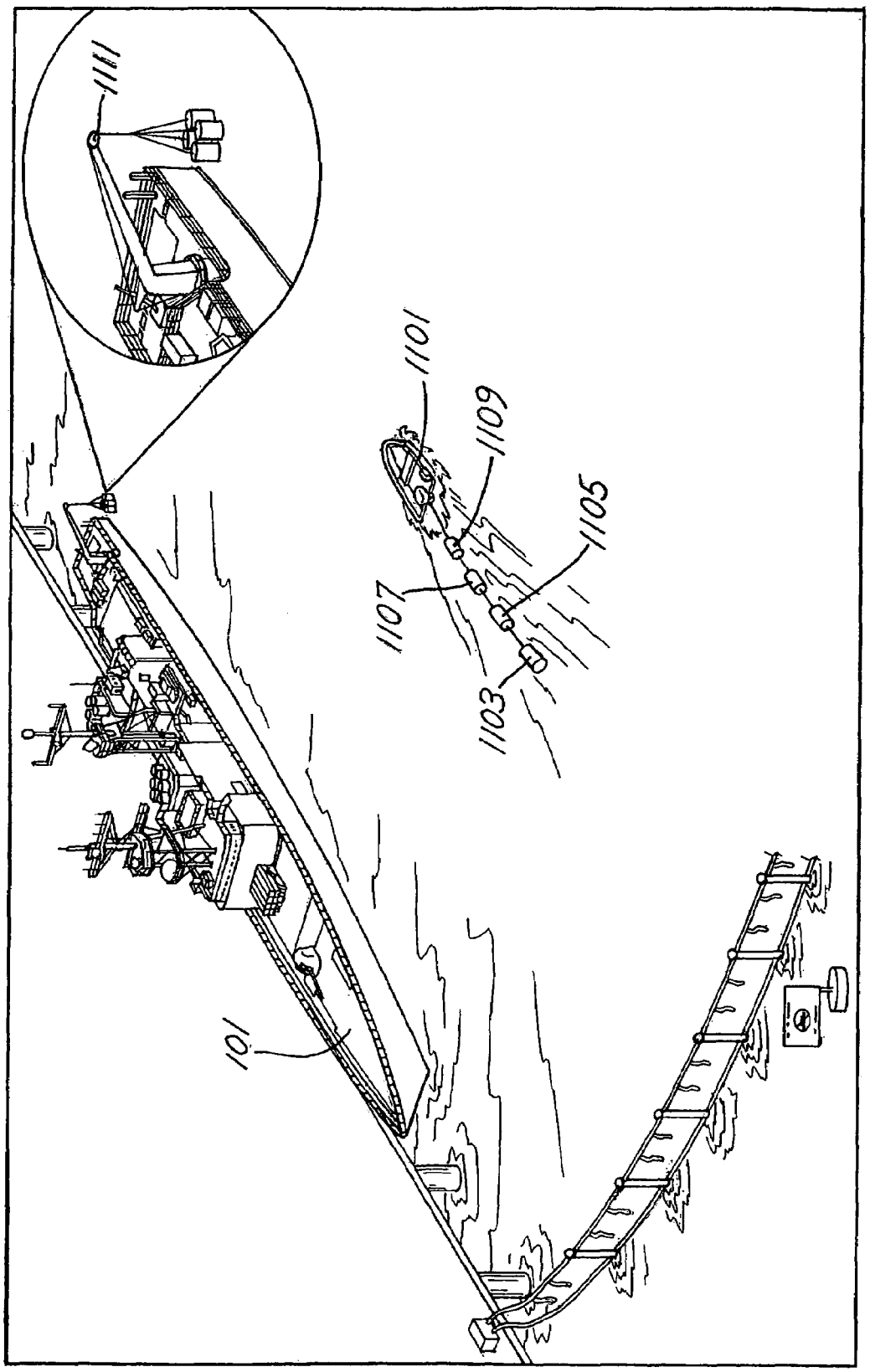
FIG. 11 shows retrieval of a harbor fence system according to an embodiment of the invention.

FIG. 11 shows retrieval of harbor fence system 103 according to an embodiment of the invention. Harbor fence system 103 is retrieved in sections (e.g. 1103, 1105, 1107, and 1109). Multiple sections may be connected together and towed by a boat 1101 to minimize the number of trips to the "mother" ship during retrieval or deployment operations. This process may be repeated for retrieving other sections of harbor fence 103. Sections of harbor fence system 103 are lifted by crane 1111 into ship 101 so that harbor fence system 101 may be transported with ship 101 to another location and redeployed.

FIG. 12 illustrates a ship 1201 that floats at a water surface 1203 and that is protected by a sonar system. In FIG. 12, ship 1201 is located in a harbor with a water depth 1205. The sonar system protects ship 1201 from intruders that pass under water (between water surface 1203 and a water bottom 1209) through a protection distance 1207. Moreover, water depth 1205 may vary in the protected region of ship 1201.

FIG. 13 shows a sonar subsystem 1300 that protects ship 1201 from underwater intruders in accordance with an embodiment of the invention. Sonar subsystem 1300 protects ship 1201 with respect to a protective boundary 1301 (e.g. a perimeter around an asset such as ship 1201 or a line of protection across a harbor that is in close proximity to the asset). (In the embodiment, protective boundary 1301 has approximately a same shape as the perimeter of harbor fence system 103.) Although the exemplary embodiment of the invention depicts ship 1201 being protected by sonar subsystem 1300, sonar subsystem 1300 may protect other types of assets that border water, either partially or completely. Exemplary assets may include power plants, bridges, oil drilling rigs, river dams, military ships, and commercial ships. Protective boundary 1301, as shown in the embodiment corresponding to FIG. 13, spans across an entrance to a mooring area for ship 1201 and may span protection distance 1207 in order to provide the same area of another sonar system. Although FIG. 13 depicts an arc, the embodiment may protect a protective boundary corresponding to a different shape (that may enclose an area around ship 1201) by routing protective boundary 1301 to correspond to the different shape.

Sonar subsystem 1300 comprises a plurality of sonar sensor modules (e.g. modules 1307, 1309, 1321, and 1323), connections 1311, 1313, 1315, and 1317, and a central processor 1319. In the embodiment, central processor 1319 may be integrated into the functionality of control unit 171 as shown in FIG. 1. (Although not shown, other sonar sensor modules along protective boundary 1301 have corresponding connections to central processor 1319.) In the embodiment, connections 1311, 1313, 1315, and 1317 may be bundled together into a cable and routed along protective boundary 1301 or may be arranged in a bus configuration to central processor 1319. Sonar sensor modules 1307, 1309, 1321, 1323, and 1325 are distributed along protective boundary 1301 in an approximately uniform manner. (In the embodiment, sonar sensor modules 1307, 1309, 1321, and 1323 may correspond to diver sensor nodes, e.g. diver sensor nodes 817 and 819 as shown in FIG. 8.) Each sonar sensor module may correspond to a sonar radiation pattern (such as a radiation pattern 1303 corresponding to sensor module 1307 and a radiation pattern 1305 corresponding to sensor module 1309). The sonar power levels of each sonar sensor module (e.g. modules 1307, 1309, 1321, 1323, and 1325) may be adjusted so that excessively strong sonar signals are not generated by each sonar sensor module beyond an associated coverage region.

Each radiation pattern may be non-directional with respect to underwater coverage (oriented in the downward position) and may have an approximate coverage range from 50 to 100 feet, thus requiring a reduced transmitted power. However, the distance of protective boundary 1301 may be substantially greater than the coverage distance of a sensor module in order to provide a total coverage range that may be as great or greater than what is provided in prior art. In the embodiment, adjacent radiation patterns (e.g. 1303 and 1305) overlap at least 50% in coverage area. Adjacent sensor modules (e.g. 1307 and 1309) are separated by approximately the minimum expected water depth 1205. However, in other embodiments of the invention, the separation between sensor modules may vary as a function of the corresponding water depth.

In the embodiment, the sensors (e.g. sensors 1307, 1309, 1321, 1323, and 1325) of sonar system 1300 are activated (in which a sensor generates a sonar signal that may be referred to as a "ping") such that a degree of interference among the sensors is limited to a level that does not cause a false detection of a target. (For example, adjacent sensors may be activated at different times if the adjacent sensors are operating at the same frequency.) The amount of adjacent interference may be controlled by adjusting a sequence of activating each sensor and by configuring different operating frequencies with different sensors.

FIG. 14 shows a vertical coverage of adjacent sonar sensor modules 1307 and 1309. FIG. 14 shows coverage regions 1401 and 1403 of adjacent sonar sensor modules 1307 and 1309, in which the distance between adjacent sensors is distance (S) 1405. Sensor modules 1307 and 1309 are situated in the proximity of water surface 1203. Sensor modules 1307 and 1309 have unidirectional coverage beams spanning coverage regions 1401 and 1403, respectively. In the embodiment, adjacent sonar sensor modules 1307 and 1309 are separated by a distance that is approximately equal to or less than water depth 1205, and coverage regions 1401 and 1403 overlap by at least 50%. However, the embodiment may be configured for different harbor topologies in which the distance between adjacent sonar sensor modules 1307 and 1309 and the degree of overlap of coverage regions 1401 and 1403 may be adjusted. Moreover, water depth 1205 may vary along protective boundary 1301. In the embodiment, the distance between adjacent sonar sensor modules is approximately equal to the minimum water depth around protective boundary 1301 (as shown in FIG. 13). However, in other embodiments of the invention, the distance between adjacent sonar sensors (e.g. sonar sensor modules 1307 and 1309) may be adjusted according to the water depth in the proximity of the adjacent sonar sensors.

Figure 15:
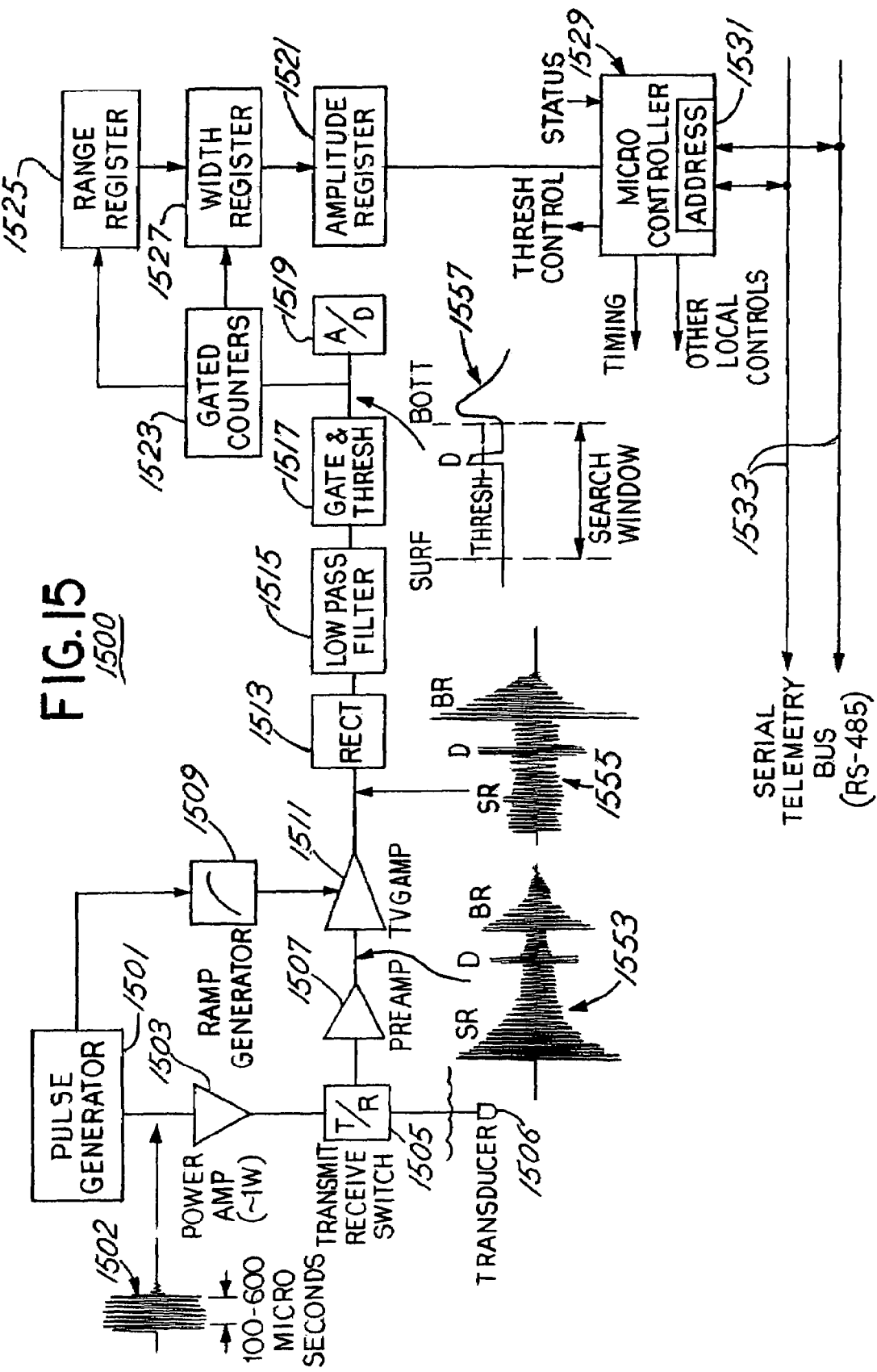
FIG. 15 shows apparatus for a sonar sensor module.

FIG. 15 shows an apparatus 1500 for a sonar sensor module, e.g. sonar sensor module 1307. Apparatus 1500, as may be instructed by central processor 1319 (that may be integrated with the functionality of control unit 171), generates a transmitted sonar signal 1502 with a pulse generator 1501, a power amplifier 1503, a transmit-receive (T/R) switch 1505, and a transducer 1506. Typically, transmitted sonar signal 1502 has a time duration between 100 and 600 microseconds, with a carrier frequency between 100 KHz to 200 KHz, but other embodiments of the invention may utilize other pulse parameters.

After sonar signal 1502 has been transmitted, T/R switch 1505 changes its state so that apparatus 1500 receives a sonar signal, resulting from reflections of transmitted sonar signal 1502. The received sonar signal is received by transducer 1506 (which functions in both the transmit mode and the receive mode) and is amplified by a preamplifier 1507. A sonar signal 1553 shows the received sonar signal at the output of preamplifier 1507. Sonar signal 1553 is characterized by three signal regions: a surface reverberation (SR) region corresponding to sonar reflections from water surface 1203 (as shown in FIG. 12), a diver (D) region corresponding to sonar reflections from a target that may be an underwater intruder, and a bottom reverberation region (BR) corresponding to sonar reflections from water bottom 1209.

A time varied gain (TVG) amplifier 1511 reduces the amplitude of the SR region of sonar signal 1553 by starting at a lower gain immediately after TR switch 1505 reverts into the receive mode (i.e. after the transmission of transmit sonar signal 1502), and by increasing its gain with time so that sonar signal 1553 from surface reverberation is equalized to approximately constant amplitude until the bottom reflections begin. The resulting sonar signal is shown as a sonar signal 1555. (The sonar signal during the BR-region is typically not equalized because the received sonar signal is subsequently gated off before the occurrence of the BR-region by a gate 1517.) Providing at least partial amplitude equalization enhances the ability to detect a target during the D-region of sonar signal 1553 by applying a threshold criteria. (Reducing the amplitude variation of sonar signal 1502 also enhances the resolution of analog to digital conversion as performed by an analog to digital converter 1519.)

A rectifier 1513 removes the sonar carrier component of sonar signal 1555 in order to obtain the corresponding envelope that is further processed by a low pass filter 1515. Gate and threshold module 1517 determines if sonar signal is above a threshold (which is indicative of a target) during a search window that spans between the initiation of sonar reception and the return of sonar reflections from water bottom 1209.

From sonar signal 1557, apparatus 1500 determines the corresponding range and amplitude of the received sonar signal as well as the width of a detected target echo during the D-region of sonar signal 1557 from a range register 1525, an amplitude register 1521, and a width register 1527, respectively that are gated by gated counters 1523. The corresponding data are collected by a microcontroller 1529. Microcontroller 1529 may provide this data to central processor 1319 through an interface 1531 and a serial telemetry bus 1533. The embodiment supports the RS-485 standard, which is a differential data transmission standard that is specified by Electronic Industries Association (EIA) and Telecommunications Industry Association (TIA). Sonar data may be collected in a variety of ways, including after each transmission of sonar signal 1502 or after a plurality of transmission of sonar signal 1502. Data may be collected autonomously, in which a sonar sensor module (e.g. module 1307) automatically sends the data, or may be collected in a polled manner, in which central processor 1319 queries each sonar sensor module to return sonar data.

The embodiment may utilize different higher layer protocols with respect to the physical layer as provided by the RS-485 standard. For example, the embodiment may support an Internet Protocol (IP) in conjunction with Transmission Control Protocol (TCP) or a customized protocol. Also, other embodiments may utilize a different physical layer such as Ethernet.

After processing the received sonar signal in response to transmitting a sonar signal at a time instance, apparatus 1500 may transmit a subsequent transmitted sonar signal 1502 at a subsequent time instance and process a received sonar signal in order to determine a range, amplitude, and width of a target corresponding to the subsequent time instance. This process is typically repeated during the detection mode of sonar subsystem 1300.

Figure 16:
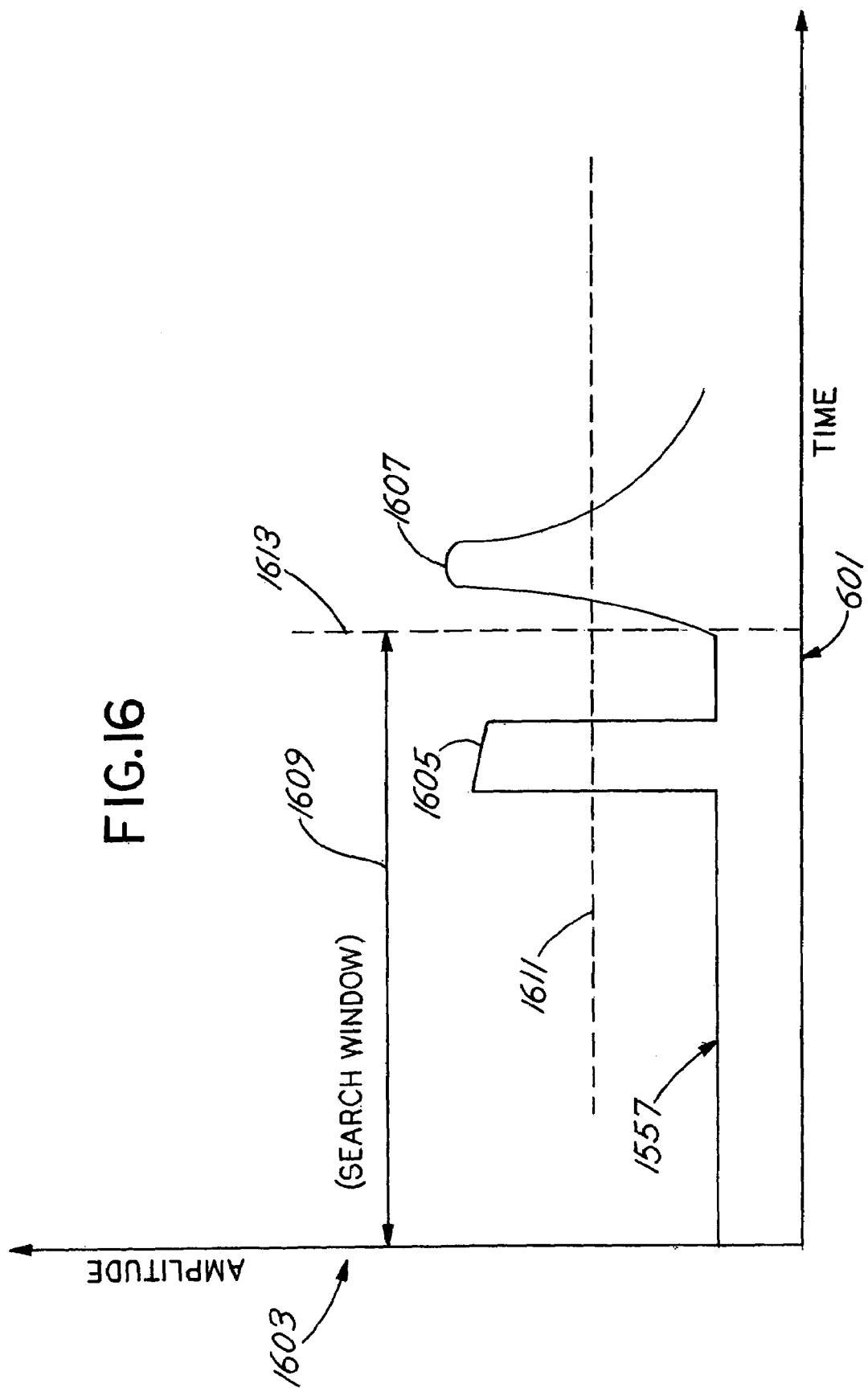
FIG. 16 shows a sonar signal that is received by a sonar sensor module.

FIG. 16 shows sonar signal 1557 that is received by a sonar sensor module. Apparatus 1500 determines whether amplitude 1603 of sonar signal 1557 during D-region 1605 exceeds a threshold 1611 during search window 1609. Sonar signal 1557 is gated off at time 1613, corresponding to the beginning of BR-region 1607. In the embodiment, central processor 1319 that is integrated with control unit 171 may set threshold 1611 by sending a command.

Figure 17:
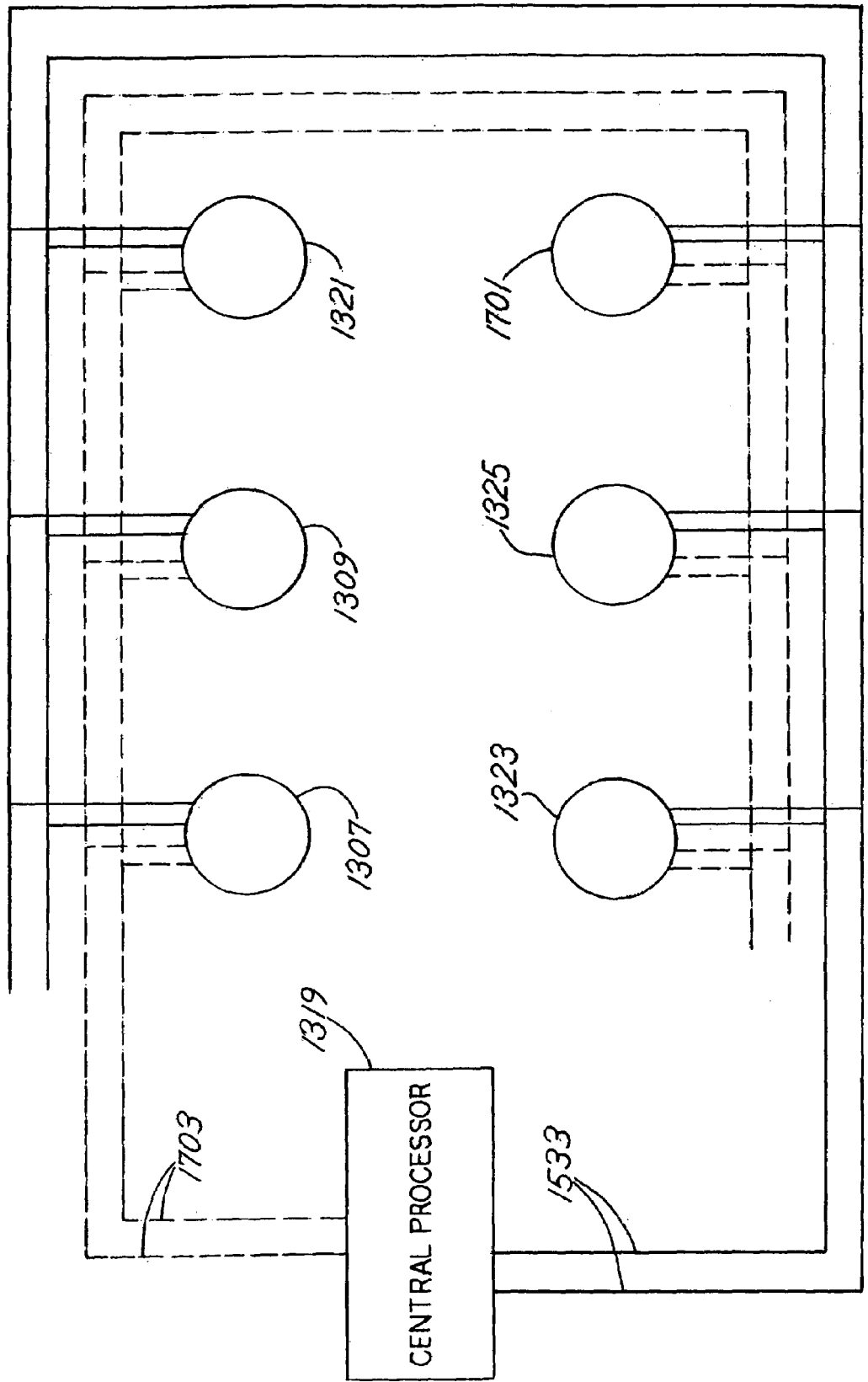
FIG. 17 shows a telemetry configuration for a sonar system.

FIG. 17 shows a telemetry configuration for a sonar subsystem 1300. Central processor 1319 collects target data (e.g. range, amplitude and target width) from each of the sonar sensor modules (e.g. modules 1307, 1309, 1321, 1323, 1325, and 1701) through telemetry bus 1533 (as shown in FIG. 15) or through a "backup" telemetry bus 1703. Telemetry busses 1533 and 1701 support two-way communication between central processor 1319 and the sonar sensor modules so that central processor 1319 may send commands to the sonar sensor modules and so that the sonar sensor modules may send information about received sonar signals to central processor 1319.

In the embodiment, telemetry bus 1533 and telemetry bus 1703 each may comprise a twisted pair of wires in order to reduce common mode noise that may be injected by noise sources along telemetry busses 1533 and 1703. Also, telemetry busses 1533 and 1703 may each provide electrical power for each of the sonar sensor modules or may provide electrical power through a separate pair of wires. Sonar subsystem 1300 supports two telemetry busses (bus 1533 and bus 1703) in order to support transmission redundancy. For example, if an intruder cuts telemetry bus 1533 or 1703, fuses or switches will isolate each side of the cut so that both telemetry busses 1533 and 1703 remain partially operational. Telemetry bus 1533 may still operate the modules before the cut, while telemetry bus 1703 operates modules after the cut. In the embodiment, if both telemetry busses 1533 and 1703 are fully operational, approximately half of the sonar sensor modules may communicate with central processor 1319 through telemetry bus 1533 while the other approximate half of the sonar sensor modules may communicate to central processor 1319 through telemetry bus 1703 in order to distribute the message traffic load.

Figure 18:
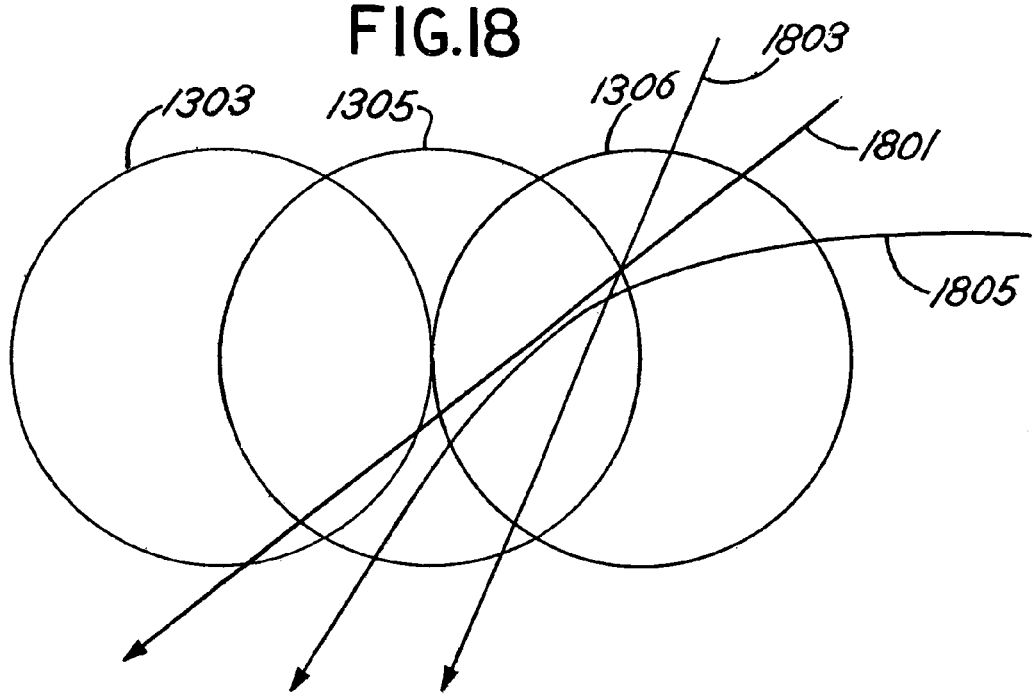
FIG. 18 shows an example of a path of an underwater intruder through a sonar system.

FIG. 18 shows an example of a path 1801 of an underwater intruder traversing through sonar subsystem 1300. (In the discussion regarding FIGS. 18–21, a target is assumed to be an underwater intruder, and is referred as such. However, sonar subsystem 1300 may determine if the target should be considered to be an underwater intruder as may be performed in step 2205 in FIG. 22.) In FIG. 18, the underwater intruder traverses through coverage areas 1303, 1305, and 1306 of sonar sensor modules 1307, 1309, and 1321, respectively. An underwater intruder may traverse different paths, such as a path 1803. With path 1803, only two adjacent sonar sensor modules (i.e. modules 1305 and 1306) detect the intruder. Even though the example shown in FIG. 18 illustrates linear path 1803, an underwater intruder may traverse a non-linear path such as path 1805 or a zigzag path (not shown).

Figure 19:
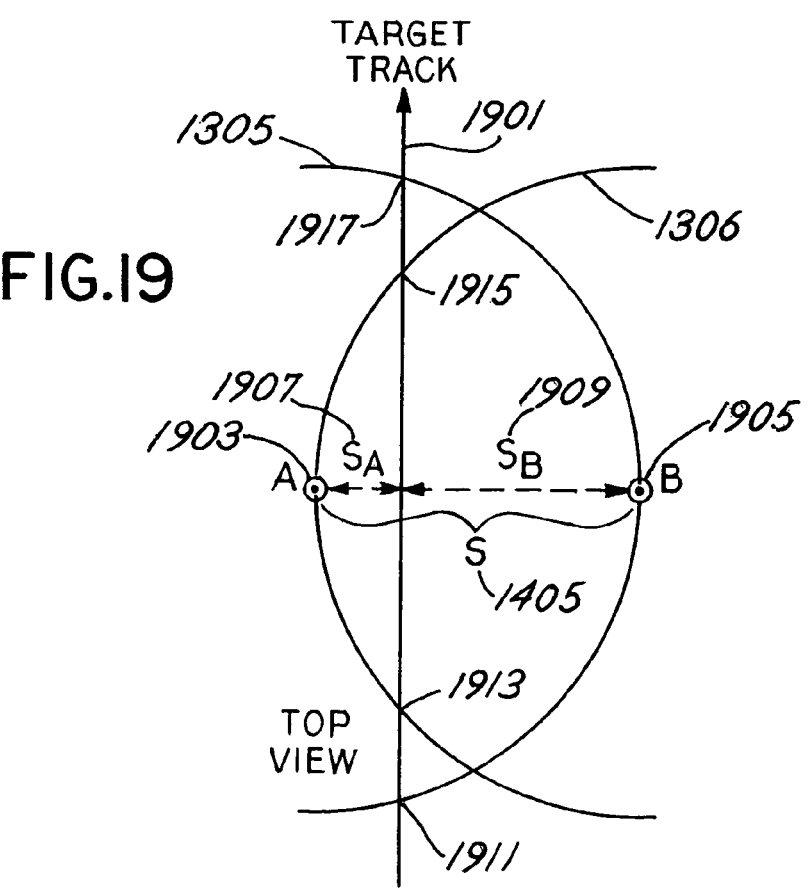
FIG. 19 shows an a path of an underwater intruder that is perpendicular to a protective boundary of a sonar system.

FIG. 19 shows a path 1901 of an underwater intruder that is essentially perpendicular to protective boundary 1301 of a sonar subsystem 1300. Path 1901 traverses through coverage regions 1305 and 1306, corresponding to sonar sensor modules 1309 and 1321, respectively. Sonar sensor module 1309 is approximately situated at a location A 1903 and sonar sensor module 1321 is approximately situated at a location B 1905. As the underwater intruder traverses path 1901, the horizontal distance to sonar sensor module 1309 is horizontal distance ($S_A$) 1907 and the horizontal distance to sonar sensor module 1321 is horizontal distance ($S_B$) 1909. The distance between sonar sensor modules 1309 and 1321 is distance (S) 1405. In geometric configuration shown in FIG. 19, S 1405 is approximately equal to $S_A$ 1907 plus $S_B$ 1909. In the embodiment, a sonar sensor module may detect the underwater intruder only if the intruder is within the coverage region of the sonar sensor module (e.g. within region 1305 for sonar sensor module 1309). Thus, sonar senor module 1309 detects the intruder between points 1911 and 1917, and sonar sensor module 1321 detects the intruder between points 1913 and 1915. Moreover, the speed of the intruder may be approximated by dividing the distance between points 1911 and 1917 by the time interval for the intruder to traverse between points 1911 and 1917. One can also perform the same calculation for points 1913 and 1915. (The approximation is more accurate the more constant the intruder's velocity is.)

Figure 20:
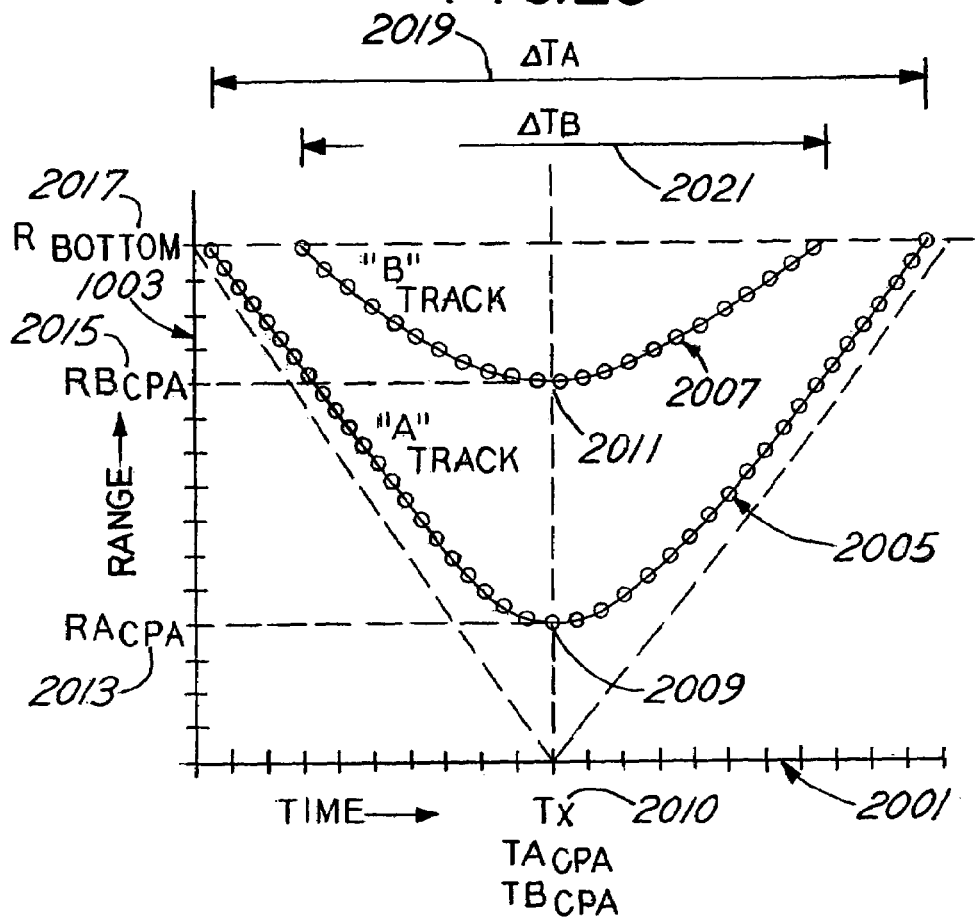
FIG. 20 shows associated tracking data of adjacent sonar sensor modules for the example shown in FIG. 19.
Figure 21:
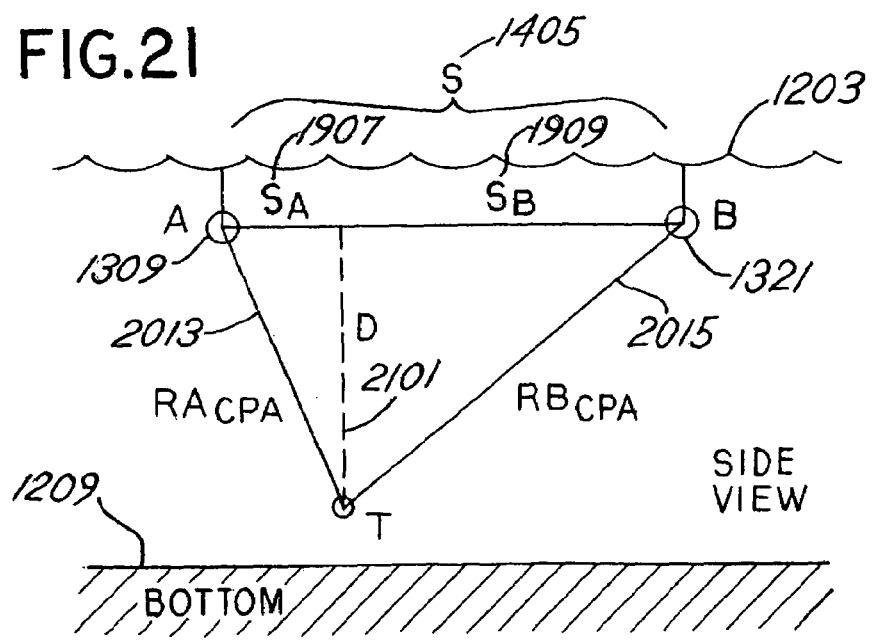
FIG. 21 shows a method of determining the depth of an underwater intruder for the example shown in FIG. 20.

FIG. 20 shows associated tracking data 2005 and 2007 obtained from adjacent sonar sensor modules 1309 and 1321, respectively, for the example shown in FIG. 19. Each data point on tracking data 2005 corresponds to a range measurement of a target from sonar sensor module 1309 (as shown in FIG. 21) and each data point on tracking data 2007 corresponds to a range measurement of the intruder from sonar sensor module 1321 (as shown in FIG. 21) as a function of time. Because the sonar coverage of a sonar sensor module is essentially omnidirectional, an individual measurement from a sonar sensor module is not indicative of the direction of an intruder's path. However, central processor 1319 may correlate data from a plurality of sonar sensor modules (e.g. modules 1309 and 1321) in order to deduce the direction of the intruder's path. In FIG. 20, a closest point of approach of the intruder (CPA) 2009 to sonar sensor module 1309 has a range $R_A$ 2013 and closest point of approach of the intruder 2011 to sonar sensor module 1321 has a range $R_B$ 2015 at approximately the same time $T_x$ 2010 for paths approximately perpendicular to the line between modules. The underwater intruder traverses between points 1911 and 1917 in a time ($\Delta T_A$) 2019 and between points 1913 and 1915 (as shown in FIG. 19) in a time ($\Delta T_B$) 2021.

FIG. 21 shows a method of determining a water depth 2101 of an underwater intruder for the example shown in FIGS. 19 and 20. In this example, the intruder is moving in a perpendicular direction to protective boundary 1301, which corresponds to a shortest path to ship 1201. In fact, from this observation, the path of the intruder may be determined. (The intruder moving in the perpendicular direction to protective boundary 1301 corresponds to CPA 2009 occurring at essentially the same time as CPA 2011.) Sonar sensor module 1309 is separated from sonar sensor 1321 by distance S 1405. Because the intruder is approaching protective boundary in the perpendicular direction, distance S 1405 is essentially equal to horizontal distance $S_A$ 1907 plus horizontal distance $S_B$ 1909.

Applying the Pythagorean theorem to a triangle corresponding to distance $S_A$ 1907, range $R_A$ 2013, and target depth D 2101 and to a triangle corresponding to distance $S_B$ 1909, range $R_B$ 2015, and water depth D 2101, one may determine target depth D by the following equations (other algorithms may be possible as well):

$$S_A = S(K/(K+1)) \quad \text{(EQ. 1)}$$

$$S_B = S(1/(K+1)) \quad \text{(EQ. 2)}$$

$$D = \sqrt{(R_B)^2 - (S_B)^2} \text{ or } D = \sqrt{(R_A)^2 - (S_A)^2} \quad \text{(EQ. 3),}$$

where $K = R_A/R_B$.

Figure 22:
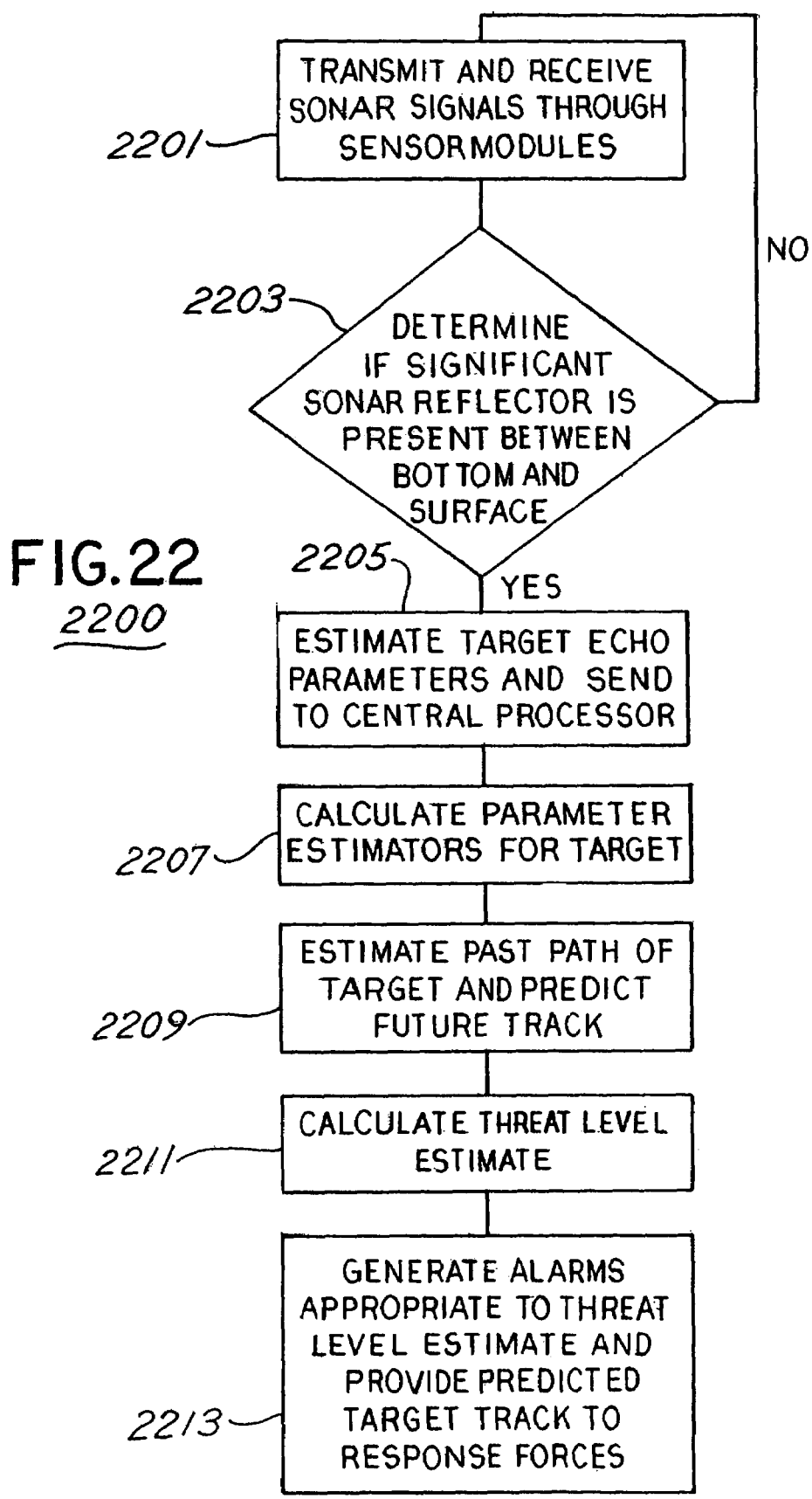
FIG. 22 shows a flow diagram for a sensor system.

FIG. 22 shows a flow diagram 2200 for sonar sensor subsystem 1300. In step 2201, (after a transmit pulse has been sent on command), sonar signals are received by a sonar sensor module (e.g. module 1307) from sonar reflections from the target. In step 2203, subsystem 1300 applies criteria to the signals to determine if a significant reflecting body is present between surface and bottom. If not, subsystem 1300 waits for another command to "ping" again, in which step 2201 is repeated. If a significant echo is received, in step 2205 sonar sensor subsystem 1300 measures parameters of the received sonar echo from the potential target. In the exemplary embodiment, sonar sensor subsystem 1300 collects tracking data (as exemplified in FIG. 13, in which measured ranges to potential targets are collected in relation to time), as well as size and amplitude data related to the echo. This data is then sent from the sonar sensor module (or modules) receiving potential target echoes to central processor 1319 through telemetry busses 1533 and 1703.

In step 2207, central processor 1319 collects and stores the recent sonar data measurements from the modules receiving echoes and uses the data to calculate at least one estimator about the target and/or the target's path (e.g. path 1801 or path 1803). In the embodiment, an estimator pertains to an initial guess of a parameter that is associated with the target or it's path (e.g. path consistency, closest point of approach, depth, speed, size, etc). In step 2209, central processor 1319 utilizes one or more estimators in order to facilitate the determining of an estimated target path. In the embodiment, as will be discussed in the context of FIGS. 23–26, central processor 1319 searches a collection of simulated tracking data and attempts to match a set of simulated tracking data to the actual sonar data. This approach is similar to a technique known as matched-field tracking. In a variation of the embodiment, as will be discussed in the context of FIGS. 27 and 28, central processor 1319 adjusts the estimated path in order to minimize an error measure between corresponding tracking data (i.e. corresponding to the estimated path) and actual tracking data. This approach is referred as error-function minimization, and may be used to improve the speed and efficiency of the target path estimation and prediction of future target locations over time.

In step 2211, central processor 1319 processes the sonar data and path estimations in order to determine if the target echo should be perceived as an dangerous (human) underwater intruder as opposed to a marine mammal, fish, or other reflector. In the exemplary embodiment, central processor 1319 develops a threat level estimate (a measure of a probability or likelihood that the target is an human underwater intruder on a relatively consistent path toward the protected asset) by comparisons with potential threat characteristics and capabilities. In the embodiment, central processor 1319 may use a target motion threat score that is based upon depth, speed, and path (track) consistency; a course direction threat score that is based on an angle of crossing protective boundary 1301; the amplitude of the received sonar signal reflected from the target in relation to the range of the target as compared with an expected "target strength"; a target echo width, relating to target size; and other criteria that may be derived from the sonar data. In step 2213, different levels of alarms may be initiated depending on the threat level estimate, and the predicted track of the target is calculated and can be provided to response forces.

Figure 23:
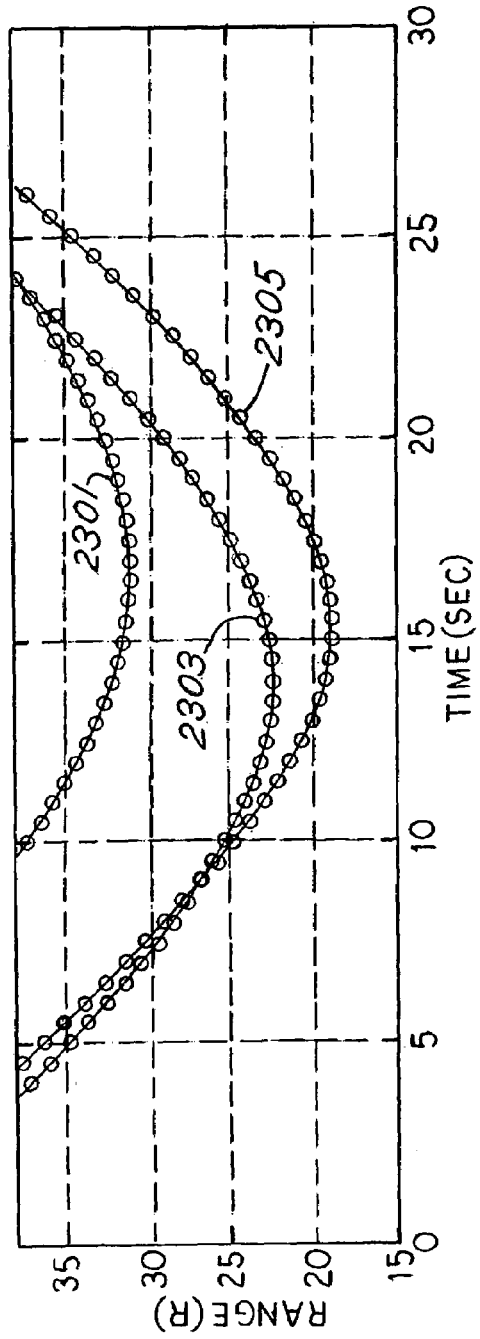
FIG. 23 shows an example of tracking data of a possible underwater intruder.

FIG. 23 shows an example of tracking data 2300 of a target. Tracking data 2300 comprises tracking data 2301, tracking data 2303, and tracking data 2305 that central processor 1319 collects from adjacent sonar sensor modules, e.g. modules 1307, 1309, and 1321, respectively.

Figure 24:
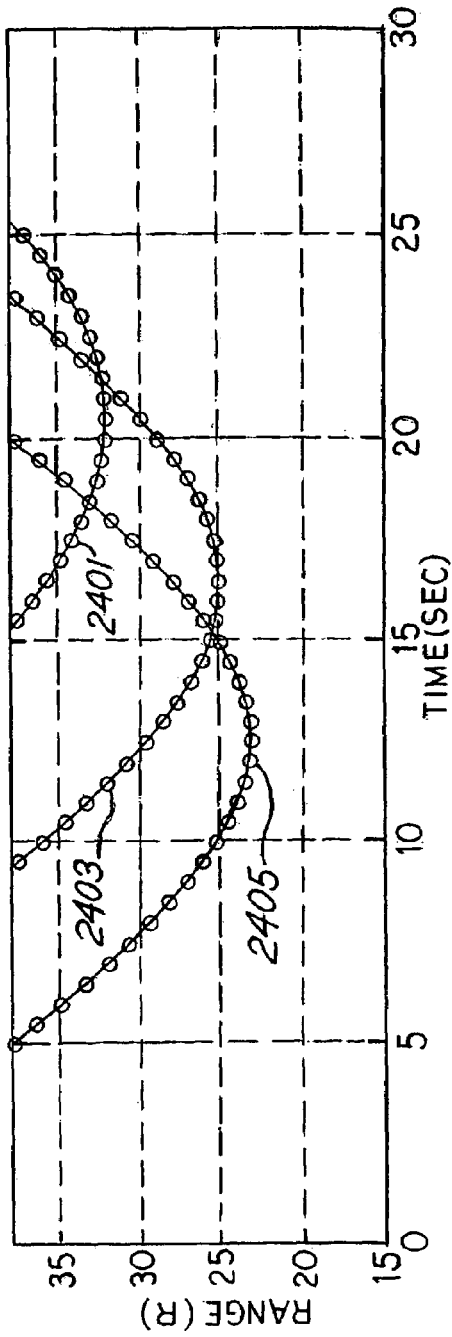
FIG. 24 shows a first example of simulated tracking data.

FIG. 24 shows a first example of simulated tracking data 2400. In an example of the embodiment, simulated tracking data 2401, 2403, and 2405 that are simulated "off-line" (i.e. previous to receiving tracking data 2300 by sonar sensor modules 1307, 1309, and 1321) for a first path of the target. Simulated tracking data are simulated for different simulated paths, and the sets of simulated tracking data (e.g. sets 2400, 2500, and 2600) are stored in a memory that is associated with central processor 1319.

Figure 25:
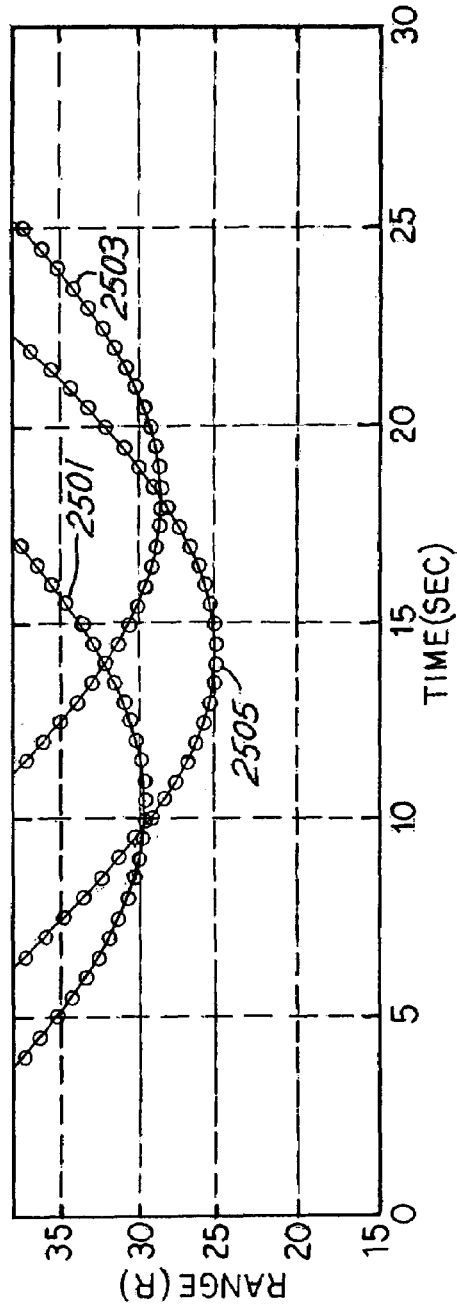
FIG. 25 shows a second example of simulated tracking data.

FIG. 25 shows a second example of a set of simulated tracking data 2500, in which simulated tracking data 2501, 2503, and 2505 are simulated sonar data from adjacent modules 1307, 1309, and 1321 corresponding to a second simulated path.

Figure 26:
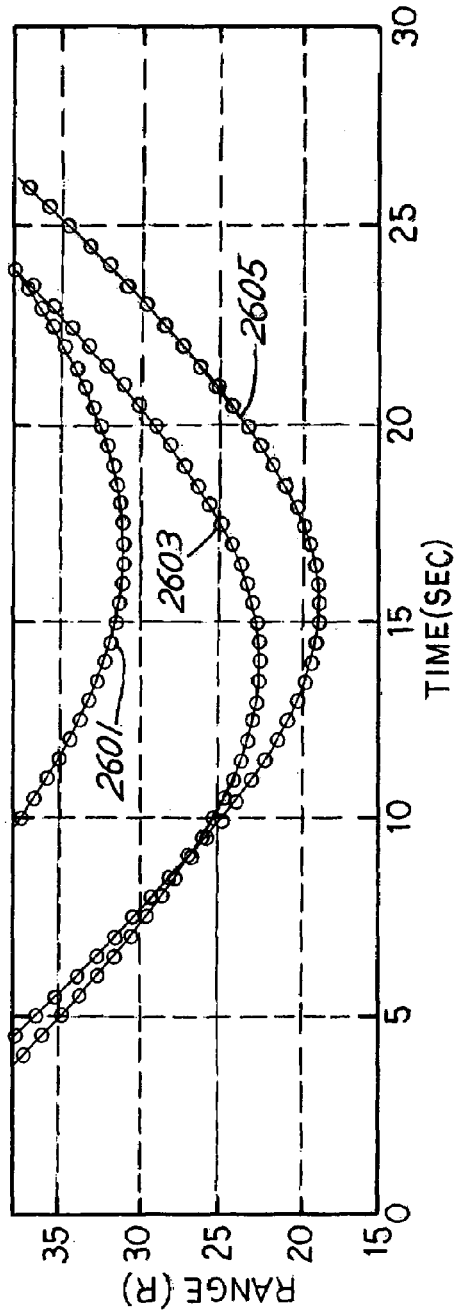
FIG. 26 shows a third example of simulated tracking data.

FIG. 26 shows a third example of a set of simulated tracking data 2600, in which simulated tracking data 2601, 2603, and 2605 are simulated sonar data from adjacent modules 1307, 1309, and 1321 corresponding to a third simulated path. In the embodiment, typically more simulated tracking data, corresponding to different simulated paths, are stored for central processor 1319 to access and to compare with tracking data 2300. Central processor 1319 may compare selected simulated tracking data to tracking data 2300 and choose a matched simulated tracking data that is "closest" to tracking data 2300. In the embodiment, the matched simulated tracking data has the smallest error when compared with tracking data 2300. Central processor 1319 consequently determines the simulated path that is associated with the matched simulated tracking data, which is consequently selected as the estimated path of the target.

For an environment, many simulated tracking data may be stored for comparison by central processor 1319. Moreover, with a variation of the embodiment, sonar subsystem 1300 may store simulated tracking data for non-linear paths so that sonar subsystem 1300 may discern a target that traverses a non-linear path such as path 1805 as shown in FIG. 18. Central processor may utilize target parameter estimations (as determined in step 2207 in FIG. 22, e.g. the target's depth) to reduce the number of memory accesses and to reduce the execution time for determining the matched simulated tracking data.

Figure 27:
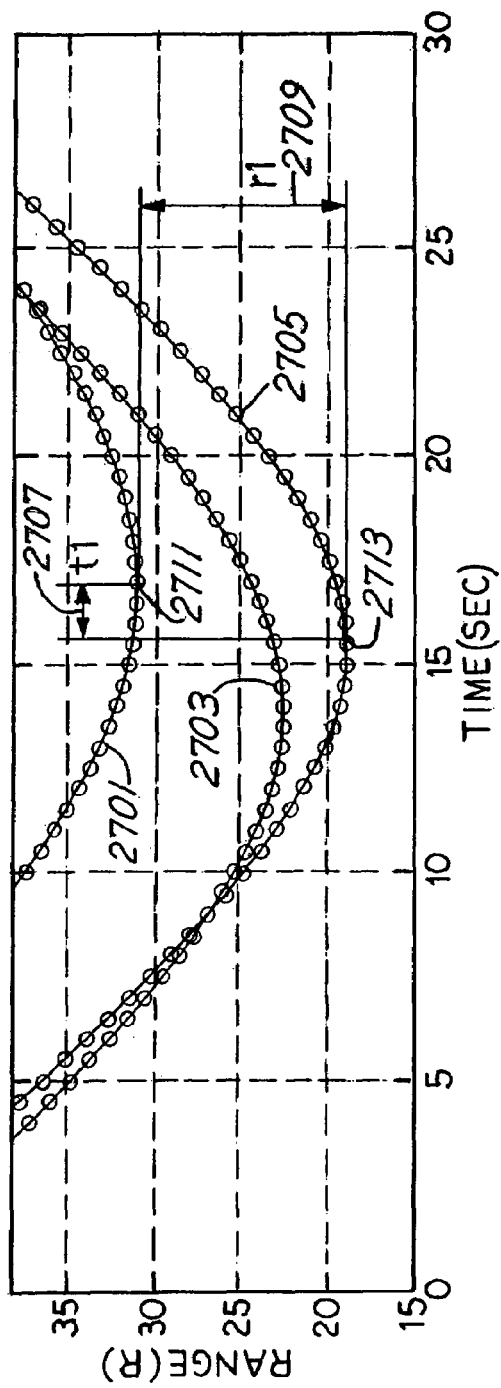
FIG. 27 shows tracking data of a target from adjacent sonar sensor modules.

FIG. 27 shows tracking data 2701, 2703, and 2705 of a target from adjacent sonar sensor modules 1307, 1309, and 1321, respectively. (In the example shown in FIG. 27, tracking data 2700 is the same as tracking data 2300 as shown in FIG. 23.) In FIG. 27, the target has a closest point of approach (CPA) to module 1307 corresponding to data point 2711. The target has a closest point of approach to module 1321 corresponding to data point 2713. A difference in time 2707 (t1) and a difference in range 2709 (r1) are determined from data points 2711 and 2713. Central processor 1319 may also determine corresponding time differences and range differences for the other tracking data (i.e. 2707 and 2703, and 2703 and 2705).

Figure 28:
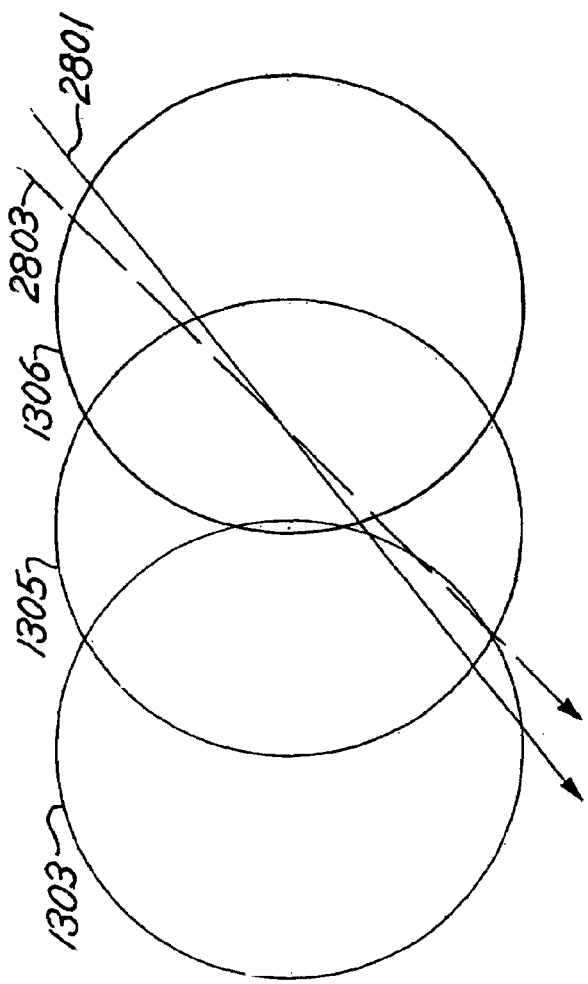
FIG. 28 shows estimated paths of the target corresponding to FIG. 27.

FIG. 28 shows initial estimated path 2801 and final estimated path 2803 of the target corresponding to FIG. 27. Central processor 1319 uses the time history of range differences from preferably two or more sonar modules to obtain an initial estimated path 2801. An estimated path corresponds to a set of tracking data that may be compared with tracking data 2700 in order to determine an error measure. The initial estimated path is adjusted in order to reduce the error measure using a multi-parameter search method. In this method, the estimated path is perturbed in each of several parameters related to the path in a sequence based on the greatest slope until a desired minimum error measure is achieved. This procedure results in a "best" estimate of the target's actual path from the sonar data in a relatively time-efficient manner. In summary, it can be said that a "matched-field" approach matches the simulated tracking data with actual tracking data, from which a best guess of a target's path is determined. An "error-function minimization" approach adjusts the estimated path to improve the accuracy and speed of calculation of the path estimate using an efficient search method.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, microcontroller, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A system for protecting an asset that abuts a body of water, the system comprising:
    a flotation component that maintains the system at essentially a surface of the body of water and that forms a security parameter capable of encompassing the asset;
    a plurality of sensor elements positioned along the flotation component, wherein the plurality of sensor elements detects an intruder breaching the security perimeter of the system; and
    a control unit that sends a command signal to the plurality of sensor elements and that receives a received signal when at least one of the plurality of sensor elements detects the intruder breaching the security perimeter, and wherein the control unit indicates a location of breaching.

2. The system of claim 1, wherein the plurality of sensor elements comprises an immersion sensor.

3. The system of claim 1, wherein the plurality of sensor elements comprises an acceleration-sensitive sensor.

4. The system of claim 3, wherein the acceleration-sensitive sensor is selected from a group consisting of an accelerometer and a hydrophone.

5. The system of claim 1, further comprising:
    a mooring that anchors the flotation component in an approximate fixed position.

6. The system of claim 1, wherein the flotation component comprises a plurality of spars and wherein a first spar is connected to an adjacent spar with at least one connecting line.

7. The system of claim 6 wherein the at least one connecting line includes a primary cable, the primary cable providing electrical power and communication to the plurality of spars.

8. The system of claim 6, wherein the first spar comprises at least one sensor of the plurality of sensors, the at least one sensor detecting the intruder when the intruder passes through the security perimeter of the system at an approximate position of the first spar.

9. The system of claim 8, wherein the first spar further comprises:
    an upper section;
    a keel that attaches to the upper section; and
    a counterweight that attaches to the keel and that provides stability to the first spar in the body of water.

10. The system of claim 9, wherein the keel retracts into the upper section.

11. The system of claim 1, further comprising:
    an underwater sonar sensor subsystem that detects an underwater intruder, wherein the control unit receives the received signal when the underwater sonar sensor subsystem detects the underwater intruder.

12. The system of claim 1 wherein the plurality of sensors comprises a first sensor submerged in the body of water and a second sensor above the body of water.

13. The system of claim 12 wherein the plurality of sensor elements detects the intruder breaching the security perimeter if the first sensor is moved above the body of water.

14. The system of claim 13 wherein the plurality of sensor elements detects the intruder breaching the security perimeter if the second sensor is moved below the surface of the body of water.

15. The system of claim 12 wherein the plurality of sensor elements detects the intruder breaching the security perimeter if the first and the second sensors are submerged in the body of water.

16. The system of claim 12 wherein the plurality of sensor elements detects the intruder breaching the security perimeter if the first and the second sensor are above the body of water.

17. A system for protecting an asset that abuts a body of water, the system comprising:
- a flotation component that maintains the system at essentially a surface of the body of water;
- a plurality of sensor elements positioned along the flotation component, wherein the plurality of sensor elements detects an intruder passing through a security perimeter of the system and comprises at least one immersion detector; and
- a control unit that sends a command signal to the plurality of sensor elements and that receives a signal when at least one of the plurality of sensor elements detects the intruder passing through the security perimeter, and wherein the control unit provides a security status.

18. The system of claim 17 wherein the plurality of sensor elements comprises a first immersion detector submerged in the water and a second immersion detector above the water and wherein the intruder passing through the security perimeter is detected if the first immersion detector and the second immersion detector are both one of submerged in the water or above the water.

19. The system of claim 17 wherein the plurality of sensor elements further comprises an acceleration-sensitive sensor.

20. The system of claim 19 wherein the intruder passing through the security perimeter is detected if the acceleration-sensitive sensor detects excessive impact on the security perimeter.

21. The system of claim 19 wherein the acceleration-sensitive sensor detects when the intruder makes contact with the system at an approximate position of the acceleration-sensitive sensor.

22. A system for protecting an asset that abuts a body of water, the system comprising:
- a flotation component that maintains the system at essentially a surface of the body of water, the flotation component forming at least a portion of a security perimeter and having a helical configuration;
- a plurality of sensor elements positioned along the flotation component, wherein the plurality of sensor elements detects an intruder breaching the security perimeter of the system; and
- a control unit that receives a signal when at least one of the plurality of sensor elements detects the intruder breaching the security perimeter, and wherein the control unit indicates a location of breaching.

23. The system of claim 22 wherein the flotation component comprises a plurality of sections, each section having a helix boom line configuration.

24. The system of claim 23 wherein each section of the plurality of sections is connected to an adjacent section at a mating connector.

25. The system of claim 23 wherein each section further comprises a mooring.

26. The system of claim 23 wherein each section further comprises at least one light along the helix boom line configuration.

27. The system of claim 26 wherein each section is transparent and wherein the at least one light is visible through the corresponding section.

28. The system of claim 22 wherein the flotation component further comprises a snubber cable.

29. The system of claim 1 further comprising a reel for retrieving the flotation component by winding the flotation component onto the reel.

30. The system of claim 1 further comprising a plurality of strobe lights positioned along the flotation component, wherein the plurality of strobe lights provides a visible indication of the presence of the security perimeter.

31. A system for protecting an asset that abuts a body of water, the system comprising:
- a flotation component that maintains the system at essentially a surface of the body of water;
- a plurality of sensor elements positioned along the flotation component, wherein the plurality of sensor elements detects an intruder passing through a security perimeter of the system and comprises a receiver module for receiving a target echo comprising sonar reflection signals from a target; and
- a control unit that receives a signal when at least one of the plurality of sensor elements detects the intruder passing through the security perimeter, the control unit comprising:
  - a detector for determining the presence of a significant reflecting body based on the target echo;
  - a sonar sensor module for processing data of the reflecting body; and,
  - a processor for determining at least one estimator based on the target echo and for determining a target path based on the at least one estimator.

32. The system of claim 31 wherein the data of the reflecting body comprises one of tracking data, size of the target and amplitude data.

33. The system of claim 31 wherein the at least one estimator comprises an estimate of a parameter associated with the target.

34. The system of claim 31 wherein the at least one estimator comprises an estimate of a parameter associated with a path of the target.

35. The system of claim 34 wherein the parameter is associated with one of path consistency, closest point of approach, depth, speed, and size.

36. The system of claim 31 wherein determining a target path based on the at least one estimator comprises matched-field tracking.

37. The system of claim 36 wherein the matched-field tracking includes searching a collection of simulated tracking data and matching the simulated tracking data to actual sonar data.

38. The system of claim 37 further comprising an adjuster for adjusting the estimated target path to minimize an error measure between corresponding tracking data and actual tracking data.

39. The system of claim 31 wherein the processor further determines a threat level estimate of the target.

40. The system of claim 39 wherein determining the threat level estimate comprises obtaining a criterion corresponding to the target and comparing the criteria with a potential threat characteristic.

41. The system of claim 40 wherein the criterion comprises a target level threat score including one of a course direction threat score, an amplitude of a received sonar signal from the target, a target echo width, and a target size.

42. The system of claim 41 further comprising an alarm capable of initiating a unique alarm at any one of a plurality of levels, each level of the plurality of levels associated with a predetermined threat level.

* * * * *